(12) United States Patent
Mironov et al.

(10) Patent No.: US 7,737,073 B2
(45) Date of Patent: *Jun. 15, 2010

(54) HYDROPROCESSING BULK CATALYST AND USES THEREOF

(75) Inventors: Oleg Mironov, Hercules, CA (US); Alexander E. Kuperman, Orinda, CA (US); Jaime Lopez, Benicia, CA (US); Axel Brait, San Rafael, CA (US); Bruce Reynolds, Martinez, CA (US); Kaidong Chen, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 12/260,379

(22) Filed: Oct. 29, 2008

(65) Prior Publication Data

US 2009/0057201 A1 Mar. 5, 2009

Related U.S. Application Data

(63) Continuation-in-part of application No. 12/168,687, filed on Jul. 7, 2008, now abandoned, which is a continuation of application No. 11/627,593, filed on Jan. 26, 2007, now Pat. No. 7,396,799, and a continuation-in-part of application No. 11/933,085, filed on Oct. 31, 2007, which is a continuation-in-part of application No. 10/938,003, filed on Sep. 10, 2004, now abandoned.

(60) Provisional application No. 60/984,323, filed on Oct. 31, 2007, provisional application No. 60/984,290, filed on Oct. 31, 2007.

(51) Int. Cl.
*B01J 21/00* (2006.01)
*B01J 31/00* (2006.01)
*B01J 27/24* (2006.01)
*B01J 27/04* (2006.01)

(52) U.S. Cl. ............... 502/200; 502/216; 502/219; 502/220; 502/221; 502/222; 502/223; 502/517; 502/168; 502/3; 502/159; 502/167

(58) Field of Classification Search ............... 502/200, 502/216, 219, 220, 221, 222, 223, 517, 167, 502/168, 3, 159
See application file for complete search history.

(56) References Cited

U.S. PATENT DOCUMENTS

| 4,801,570 A * | 1/1989 | Young et al. ............ 502/220 |
| 4,940,533 A | 7/1990 | Simpson |
| 5,094,994 A | 3/1992 | Sherwood et al. |
| 7,410,928 B2 * | 8/2008 | Chen et al. ............ 502/216 |
| 7,544,285 B2 * | 6/2009 | Domokos et al. ......... 208/213 |
| 2002/0010088 A1 | 1/2002 | Eijsbouts et al. |
| 2006/0060503 A1 * | 3/2006 | Soled et al. .......... 208/111.3 |

OTHER PUBLICATIONS

Hydrodesulfurization Catalysis by Transition Metal Sulfides by Pecoraro et al., Journal of Catalysis 67, 430-445 (1981).
A review of zinc dialkyldithiophosphates (ZDDPS): characterization and role in the lubricating oil by Barnes et al.. Tribology International 34 (2001) 389-395.
Petroleum residue upgrading with dispersed catalysts Part I. Catalysts activity and selectivity. Applied Catalysis A: General 204 (2000) 203-213.
Iron sulfide Catalysts for Coal Liquefaction Prepared Using a Micellar Technique by Chadha et al., Ind. Eng. Chem. Res. 1996. 35. 2916-2919.
Nickel, Cadium and Lead Sulfides as Catalysts in the Vapor Phase Reduction of Nitrobenzene by Brown et al.. Laboratory of Physical Chemistry. Indiana University. Jul. 29, 1938.
Solution Synthesis of the unsupported Ni-W sulfide hytrotreating catalysts by Le et al., Catalysis Today 130 (2008) 24-31.
Thermal decomposition of sulfur comppunds. I. 2-Methyl-2-propanethiol by Thompson et al., Bureau of Mines. Petroleum and Oil-Shale Experiment Station. Nov. 19, 1951.
Hydroprocessing of heavy petroleum feeds: tutorial by Ancheyta et al. Catalysis today 109 (2005) 3-15.
A review of recent advances on process technologies for upgrading of heavy oils and residue by Rana et al.. Fuel 86 (2007) 1216-1231.

* cited by examiner

*Primary Examiner*—Elizabeth D Wood

(57) ABSTRACT

A hydroprocessing bulk catalyst is provided. A process to prepare hydroprocessing bulk catalysts is also provided. The hydroprocessing catalyst has the formula $(M^t)_a(L^u)_b(S^v)_d (C^w)_e(H^x)_f(O^y)_g(N^z)_h$, wherein M is at least one group VIB metal; promoter metal L is optional and if present, L is at least one Group VIII non-noble metal; t, u, v, w, x, y, z representing the total charge for each of the components (M, L, S, C, H, O and N, respectively); $ta+ub+vd+we+xf+yg+zh=0$; $0=<b$; and $0=<b/a=<5$, $(a+0.5b)<=d<=(5a+2b)$, $0<=e<=11(a+b)$, $0<=f<=7(a+b)$, $0<=g<=5(a+b)$, $0<=h<=0.5(a+b)$. The catalyst has an X-ray powder diffraction pattern with at least one broad diffraction peak at any of Bragg angles: 8 to 18°, 32 to 40°, and 55 to 65° (from 0 to 70° 2-θ scale). In one embodiment, the catalyst is prepared by sulfiding at least one Group VIB metal compound and optionally at least one group VIII metal compound with a sulfiding agent forming a catalyst precursor; and mixing the catalyst precursor with a hydrocarbon compound to form the hydroprocessing catalyst composition.

21 Claims, 10 Drawing Sheets

HYDROPROCESSING BULK CATALYST AND USES THEREOF

CROSS-REFERENCE TO RELATED APPLICATIONS

This application claims benefit under 35 USC 119 of U.S. Provisional Patent Application Nos. 60/984,323 and 60/984,290, all with a filing date of Oct. 31, 2007. This application is a CIP of and claims priority to U.S. patent application Ser. No. 11/933,085 filed Oct. 31, 2007. This application is also a CIP of and claims priority to U.S. patent application Ser. No. 12/168,687 filed Jul. 7, 2008, which is a continuation of U.S. patent application Ser. No. 11/627,593 filed Jan. 26, 2007, now U.S. Pat. No. 7,396,799, which is a continuation-in-part of U.S. patent application Ser. No. 10/938,003 filed Sep. 10, 2004, abandoned.

TECHNICAL FIELD

The invention relates generally to bulk catalysts for use in the conversion of heavy oils and residua and methods for making thereof.

BACKGROUND

The petroleum industry is increasingly turning to heavy crudes, resids, coals and tar sands as sources for feedstocks. Feedstocks derived from these heavy materials contain more sulfur and nitrogen than feedstocks derived from more conventional crude oils, requiring a considerable amount of upgrading in order to obtain usable products therefrom. The upgrading or refining is accomplished by hydrotreating processes, i.e., treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds.

Catalyst precursors commonly used for these hydrotreating reactions include materials such as cobalt molybdate on alumina, nickel on alumina, cobalt molybdate promoted with nickel, nickel tungstate, etc. U.S. Pat. Nos. 4,824,821 and 5,484,755 and US Patent Publication No. 2006/0054535 disclose hydroprocessing catalysts in the form of high activity slurry. The slurry catalyst is produced from group VIB metal compounds by sulfiding an aqueous mixture of the metal compound with hydrogen sulfide ($H_2S$) gas at a pressure of up to 5,000 psi (340 atm).

US Patent Publication No. 20070161505 discloses an ultra-dispersed catalyst composition having a median particle diameter between 30-6000 nm, prepared by mixing separate micro-emulsions of Group VIB or VIIIB non-noble metals. Each micro-emulsion is prepared by mixing solutions containing either Group VIB or VIIIB metal with a hydrocarbon feedstock. As the metals are sulfided separately, when the micro-emulsions are mixed together, a first metal component (e.g., NiS) simply deposits on the outer layer of the second metal component (e.g., $MoS_2$), thus forming a "core shell" type catalyst structure. Core-shell type catalysts formed with pre-sulfided metal components have lower catalytic activity than catalysts formed in a process wherein the metals are allowed to react/in contact with each other prior to sulfidation to form a more homogeneous structure.

In the preparation of a bulk slurry type catalyst, it is desirable to control the agglomeration of the catalyst to get small and dispersed catalyst particle distribution. It is also desirable to increase the incorporation of sulfur in the catalyst precursor in the sulfidation step. There is still a need for improved catalysts with optimum morphology, structure and improved catalytic activity for high yield conversions. There is also an improved process to prepare bulk catalysts for use in the conversion of heavy oils and residua.

SUMMARY OF THE INVENTION

In one aspect, this invention relates to a hydroprocessing catalyst having the formula $(M^t)_a(L^u)_b(S^v)_d(C^w)_e(H^x)_f(O^y)_g(N^z)_h$, wherein M is at least one group VIB metal; L is optional, and if present L is at least one of a non-noble Group VIII metal, a Group VIIIB metal, a Group VIB metal, a Group IVB metal, and a Group IIB metal; t, u, v, w, x, y, z representing the total charge for each of the component (M, L, S, C, H, O, and N); $ta+ub+vd+we+xf+yg+zh=0$; b is $>=0$; and $0=<b/a=<5$, $(a+0.5b)<=d<=(5a+2b)$, $0<=e<=11(a+b)$, $0<=f<=7(a+b)$, $0<=g<=5(a+b)$, $0<=h<=0.5(a+b)$. The catalyst has an X-ray powder diffraction pattern with at least one broad peak at any of Bragg angles: 8 to 18°, 32 to 40°, and 55 to 65° (from 0 to 70° 2θ scale). In one embodiment, at least one diffraction peak is greater than 2 degrees 2θ wide at ½ height.

In another aspect, there is provided a hydroprocessing catalyst having the formula $(M)_a(L)_b(S)_d(C)_e(H)_f(O)_g(N)_h$, wherein M is selected from molybdenum, tungsten, and mixtures thereof, L is optional, and if present, L is selected from nickel, cobalt, and mixture thereof.

In one aspect, there is provided a process for preparing a hydroprocessing catalyst composition, which process comprising the steps of combining and reacting at least one Group VIB metal compound with at least a metal compound selected from a non-noble Group VIII metal, a Group VIIIB metal, a Group VIB metal, a Group IVB metal, and a Group IIB metal ("promoter metal"), to obtain an intermediate mixture; sulfiding the intermediate mixture with a sulfiding agent forming a catalyst precursor; and iii) mixing the catalyst precursor with a hydrocarbon compound to form a catalyst composition having formula $(M^t)_a(L^u)_b(S^v)_d(C^w)_e(H^x)_f(O^y)_g(N^z)_h$, wherein the molar ratio of the sulfiding agent to the at least one Group VIB metal compound and the at least a promoter metal compound is sufficient for subscript d to have a value of: $(a+0.5b) \leq d \leq (5a+2b)$, and wherein the catalyst precursor is mixed with a sufficient amount of hydrocarbon for subscript e to have a value of $0 \leq e \leq 11 (a+b)$. In the formula, subscripts a and b each are suitably greater than 0 such that $0 \leq b/a \leq 5$, $0 \leq f \leq 7(a+b)$, $0 \leq g \leq 5(a+b)$, $0 \leq h \leq 0.5(a+b)$; t, u, v, w, x, y, z representing the total charge for each of the components (M, L, S, C, H, O and N, respectively); and $ta+ub+vd+we+xf+yg+zh=0$.

In another aspect, there is provided a process for preparing a hydroprocessing catalyst having the formula $(M^t)_a(L^u)_b(S^v)_d(C^w)_e(H^x)_f(O^y)_g(N^z)_h$, wherein M is selected from molybdenum, tungsten, and mixtures thereof, L is optional, and if present, L is selected from nickel, cobalt, and mixture thereof, and wherein the sulfiding agent is ammonium sulfide.

In yet another aspect, there is provided a process for hydrofining oil feedstock which comprises contacting the feedstock with a catalyst under hydrorefining conditions, wherein the catalyst comprises a bulk metal catalyst of the formula $(M)_a(L)_b(S)_d(C)_e(H)_f(O)_g(N)_h$, wherein M is selected from molybdenum, tungsten, and mixtures thereof, L is selected from nickel, cobalt, and mixture thereof, $0=<b$ and $0=<b/a=<5$, $(a+0.5b)<=d<=(5a+2b)$, $0<=e<=11(a+b)$, $0<=f<=7(a+b)$, $0<=g<=5(a+b)$, $0<=h<=0.5(a+b)$, and wherein the catalyst has an X-ray powder diffraction pattern with a first broad peak at Bragg angle of 8 to 15° and a second broad peak at Bragg angle of 32 to 40° (from 0 to 70° 2θ scale). The hydrofining conditions in one embodiment include temperatures of 200 to 450° C., hydrogen pressures of from 5 to 300 bar, liquid hourly space velocities of from 0.05 to 10 h$^{-1}$ and hydrogen treat gas rates of from 35.6 to 1780 m$^3$/m$^3$ (200 to 10000 SCF/B).

DETAILED DESCRIPTION

Figure 1:
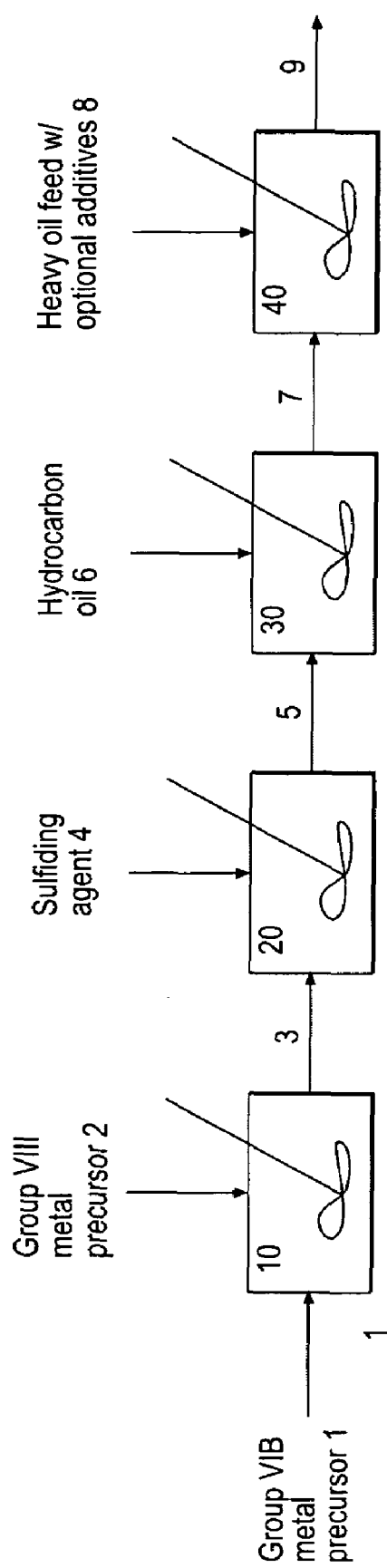
FIG. 1 illustrates the steps involved in an embodiment for preparing the catalyst composition.

The following terms will be used throughout the specification and will have the following meanings unless otherwise indicated.

As used here, the term "bulk catalyst" may be used interchangeably with "unsupported catalyst," meaning that the catalyst composition is NOT of the conventional catalyst form which has a preformed, shaped catalyst support which is then loaded with metals via impregnation or deposition catalyst. In one embodiment, the bulk catalyst is formed through precipitation. In another embodiment, the bulk catalyst has a binder incorporated into the catalyst composition. In yet another embodiment, the bulk catalyst is formed from metal compounds and without any binder. In a fourth embodiment, the bulk catalyst is a dispersing-type catalyst ("slurry catalyst") for use as dispersed catalyst particles in mixture of liquid (e.g., hydrocarbon oil).

As used herein, the term "free of promoter metal" or "substantially free of promoter metal" means that in the production of the bulk catalyst, no promoter metal, e.g., group VIII metals in their elemental, compound, or ionic form, will be added. Traces of group VIII promoter metals such as nickel can be present. Generally, however, the amount of group VIII metals if any is less than 0.1 wt. % (of the total weight of the bulk catalyst).

As used herein, "heavy oil" feed or feedstock refers to heavy and ultra-heavy crudes, including but not limited to resids, coals, bitumen, tar sands, etc. Heavy oil feedstock may be liquid, semi-solid, and/or solid. Examples of heavy oil feedstock that might be upgraded as described herein include but are not limited to Canada Tar sands, vacuum resid from Brazilian Santos and Campos basins, Egyptian Gulf of Suez, Chad, Venezuelan Zulia, Malaysia, and Indonesia Sumatra. Other examples of heavy oil feedstock include residuum left over from refinery processes, including "bottom of the barrel" and "residuum" (or "resid")—atmospheric tower bottoms, which have a boiling point of at least 343° C. (650° F.), or vacuum tower bottoms, which have a boiling point of at least 524° C. (975° F.), or "resid pitch" and "vacuum residue"—which have a boiling point of 524° C. (975° F.) or greater.

Properties of heavy oil feedstock may include, but are not limited to: TAN of at least 0.1, at least 0.3, or at least 1; viscosity of at least 10 cSt; API gravity at most 15 in one embodiment, and at most 10 in another embodiment. A gram of heavy oil feedstock typically contains at least 0.0001 grams of Ni/V/Fe; at least 0.005 grams of heteroatoms; at least 0.01 grams of residue; at least 0.04 grams C5 asphaltenes; at least 0.002 grams of MCR; per gram of crude; at least 0.00001 grams of alkali metal salts of one or more organic acids; and at least 0.005 grams of sulfur. In one embodiment, the heavy oil feedstock has a sulfur content of at least 5 wt. % and an API gravity ranging from −5 to +5. A heavy oil feed comprises Athabasca bitumen (Canada) typically has at least 50% by volume vacuum reside. A Boscan (Venezuala) heavy oil feed may contain at least 64% by volume vacuum residue.

The terms "treatment," "treated," "upgrade", "upgrading" and "upgraded", when used in conjunction with a heavy oil feedstock, describes a heavy oil feedstock that is being or has been subjected to hydroprocessing, or a resulting material or crude product, having a reduction in the molecular weight of the heavy oil feedstock, a reduction in the boiling point range of the heavy oil feedstock, a reduction in the concentration of asphaltenes, a reduction in the concentration of hydrocarbon free radicals, and/or a reduction in the quantity of impurities, such as sulfur, nitrogen, oxygen, halides, and metals.

The upgrade or treatment of heavy oil feeds is generally referred herein as "hydroprocessing" (or hydroconversion). Hydroprocessing is meant as any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking. The products of hydroprocessing may show improved viscosities, viscosity indices, saturates content, low temperature properties, volatilities and depolarization, etc.

As used herein, hydrogen refers to hydrogen, and/or a compound or compounds that when in the presence of a heavy oil feed and a catalyst react to provide hydrogen.

As used herein, the term "surfactant" (can be used interchangeably with "surface active agent," "stabilizer, or "surface modifier") refers generally to any material that operates to low the surface tension of a liquid, thus improving the wetting at the interface between the dispersed catalyst particles and the hydrocarbon oil. Alternatively or in combination, the surfactant operates to lower the surface tension between the catalyst material in suspension and the solvent/solution in which the catalyst material is suspended, thus in one embodiment the surfactant allows controlled and dispersed layering of the catalyst particles in the solution that contains the catalyst material.

As used herein, the term "catalyst precursor" refers to a compound containing one or more catalytically active metals, from which compound the catalyst of the invention having the formula $(M^t)_a(L^u)_b(S^v)_d(C^w)_e(H^x)_f(O^y)_g(N^z)_h$, is eventually formed, and which compound may be catalytically active as a hydroprocessing catalyst.

As used herein, the phrase "one or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and $Z_n$).

As used herein, "heavy oil" feed or feedstock refers to heavy and ultra-heavy crudes, including but not limited to resids, coals, bitumen, tar sands, etc. Heavy oil feedstock may be liquid, semi-solid, and/or solid.

SCF/BBL (or scf/bbl) refers to a unit of standard cubic foot of gas ($N_2$, $H_2$, etc.) per barrel of hydrocarbon feed.

The Periodic Table referred to herein is the Table approved by IUPAC and the U.S. National Bureau of Standards, an example is the Periodic Table of the Elements by Los Alamos National Laboratory's Chemistry Division of October 2001.

The term "Group VIII metal" refers to iron, cobalt, nickel, ruthenium, rhenium, palladium, osmium, iridium, platinum, and combinations thereof in their elemental, compound, or ionic form.

The term "Group VIB metal" refers to chromium, molybdenum, tungsten, and combinations thereof in their elemental, compound, or ionic form.

Catalyst Formula: In one embodiment, the catalyst composition as expressed in elemental form, is of the general formula $(M^t)_a(L^u)_b(S^v)_d(C^w)_e(H^x)_f(O^y)_g(N^z)_h$. The formula herein refers to the catalyst solids, constituting the catalyst slurry in oil, prepared by the method described below. In the equation, M represents at least one group VIB metal, such as Mo, W, etc. or a combination thereof. L is optional and if present, functions as a promoter metal, representing at least one of: a non-noble Group VIII metal such as Ni, Co; a Group VIIIB metal such as Fe; a Group VIB metal such as Cr; a Group IVB metal such as Ti; a Group IIB metal such as Zn, and combinations thereof (L is hereinafter referred to as "promoter metal"). Also in the equation, t, u, v, w, x, y, z representing the total charge for each of the component (M, L, S, C, H, O and N, respectively); $ta+ub+vd+we+xf+yg+zh=0$. The subscripts ratio of b to a has a value of 0 to 5, and ($0<=b/a<=5$). S represents sulfur with the value of the subscript d ranging from $(a+0.5b)$ to $(5a+2b)$. C represents carbon with subscript e having a value of 0 to $11(a+b)$. H is hydrogen with the value of f ranging from 0 to $7(a+b)$. O represents oxygen with the value of g ranging from 0 to $5(a+b)$; and N represents nitrogen with h having a value of 0 to $0.5(a+b)$.

In one embodiment, the catalyst is without any promoter L, for $b=0$. In another embodiment with promoter metal L, a and b each are suitably greater than 0 such that the ratio of a:b is in the range of 1:5 to 10:1. For example, in one embodiment with b/a having a value of 0.2, a has a value of 5 and b has a value of 1. Thus, at this b/a ratio of 0.2, $(M^t)_a(L^u)_b(S^v)_d(C^w)_e(H^x)_f(O^y)_g(N^z)_h$ would include compositions ranging from $(M)_5(L)(S)_{5.5}$, including $(M)_5(L)(S)_{5.5}(C)(H)(O)(N)$, to $(M)_5(L)(S)_{27}(C)_{66}(H)_{42}(O)_{30}(N)_3$.

In one embodiment, M is at least one or two metals selected from chromium, molybdenum and tungsten. In a second embodiment, M is selected from molybdenum, tungsten and a combination of the two. In yet another embodiment, M is molybdenum.

In one embodiment where both molybdenum and tungsten are used, the catalyst is of the formula $(Mo_zW_{1-z})_a(L)_b(S)_d(C)_e(H)_f(O)_g(N)_h$, where $0 \leq z \leq 1$. In yet another embodiment where M is a mixture of Mo and W, the molybdenum to tungsten ratio is in the range of 9:1-1:9.

In one embodiment, L is at least one or two non-noble metals selected from nickel, cobalt and iron. In a second embodiment, L is selected from nickel, cobalt and a combination of nickel and cobalt. In a third embodiment, L is nickel. In one embodiment where L is a mixture of two metals such as Ni and Co, the catalyst is of the formula $(M)_a(Ni_zCo_{1-z})_b(S)_d(C)_e(H)_f(O)_g(N)_h$, where $0 \leq z \leq 1$. In another embodiment where L is a mixture of multiple metals such as Ni, Co, Fe, Zn, Cr, Ti, the catalyst is of the formula $(M)_a(Ni_zCo_{z'}Fe_{z''}Zn_{z*}Cr_{z*'}Ti_{z*''})_b(S)_d(C)_e(H)_f(O)_g(N)_h$, where $0 \leq z, z', z'', z*, z*', z*''$ and $(z+z'+z''+z*+z*'+z*'')=1$.

In the sections that follow, the reference to "molybdenum" is by way of exemplification only for component (M) in the formula $(M^t)_a(L^u)_b(S^v)_d(C^w)_e(H^x)_f(O^y)_g(N^z)_h$, and is not intended to exclude other Group VIB metals/compounds and mixtures of Group VIB metal/compounds represented by (M) in the catalyst formula. Similarly, the reference to "nickel" is by way of exemplification only for the component (L) in the formula $(M^t)_a(L^u)_b(S^v)_d(C^w)_e(H^x)_f(O^y)_g(N^z)_h$, and is not meant to exclude other promoter metals, i.e., group VIII non-noble metal components, Group VIIIB metals; Group VIB metals; Group IVB metals; Group IIB metals and mixtures thereof that can be used in the catalyst formula.

The sections that follow describe reagents that can be used in the manufacture $(M^t)_a(L^u)_b(S^v)_d(C^w)_e(H^x)_f(O^y)_g(N^z)_h$. The term reagent refers to a raw material that can be used in the manufacture of the catalyst, which can be in their elemental, compound, or ionic form.

As used herein, the term "metal" refers to reagents in their elemental, compound, or ionic form. Also as used herein, the term "metal" or "metal precursor" in the singular form is not limited to a single metal or metal precursor, i.e., Group VIB or promoter metals, but also includes the plural references for mixtures of metals. As used herein, "in the solute state" means that the metal component is in a protic liquid form. Also as used herein, the term "metal precursor" refers to the metal compound feed to the process.

Group VIB Transition Metal/Precursor Component: In one embodiment, at least part of the Group VIB transition (M) metal precursor is added in the solid state. In a second embodiment, at least part of the group VIB metal precursor is added in the solute state. In one embodiment, the molar ratio of Group VIB metal to promoter metal is in the range of 9:1-1:9. In a second embodiment, the molar ratio is in the range of 3:1 to 1:3.

In one embodiment, (M) metal precursor is selected from molybdenum and/or tungsten components, e.g., alkali metal or ammonium metallates of molybdenum, (e.g., ammonium molybdate and also iso-, peroxo-, di-, tri-, tetra-, hepta-, octa-, or tetradecamolybdate), ammonium salts of phosphomolybdic acids, Mo—P heteropolyanion compounds, Wo—Si heteropolyanion compounds, W—P heteropolyanion compounds. W—Si heteropolyanion compounds, Ni—Mo—W heteropolyanion compounds. Co—Mo—W heteropolyanion compounds, alkali metal or ammonium tungstates (also meta-, para-, hexa-, or polytungstate), or mixtures thereof, added in the solute state such as water-soluble molybdenum and tungsten compounds.

In one embodiment, the (M) metal precursor is selected from the group of alkali metal or ammonium metallates of molybdenum in organic solvents such as a normal alkane, hydrocarbons, or petroleum products such as distillate fractions wherein the molybdenum compound is allowed to subsequently decompose under pressure and temperature, prior to or concurrent with the addition of the promoter metal precursor.

In yet another embodiment, the group VIB metal precursor is selected from the group of alkali metal heptamolybdates, alkali metal orthomolybdates, alkali metal isomolybdates, phosphomolybdic acid, and mixtures thereof. In a fourth embodiment, it is selected from the group of molybdenum (di- and tri) oxide, molybdenum carbide, molybdenum nitride, aluminum molybdate, molybdic acid (e.g. $H_2MoO_4$), or mixtures thereof. In a fifth embodiment, the group VIB metal compound is an organometallic complex, e.g., oil soluble compound or complex of transition metal and organic acid, selected from naphthenates, pentanedionates, octoates, acetates, and the like. Examples include molybdenum naphthanate and molybdenum hexacarbonyl.

In one embodiment, the (M) precursor is a water-soluble ammonium heptamolybdate $[(NH_4)_6Mo_7O_{24}*4H_2O]$. In another embodiment, it is ammonium thiomolybdate. In yet another embodiment, it is a polyalkyl thiomolybdate.

Promoter Metal Precursor: The promoter metal L is optional. In one embodiment, the catalyst precursor is optionally promoted with at least a metal component as promoter metal L. In one embodiment, the promoter metal (L) precursor is in a solute state, wherein the whole amount of the metal precursor is in a protic liquid form, and wherein the metal is at least partly present as a solid and partly dissolved in the protic liquid in one embodiment.

In one embodiment, the promoter metal (L) precursor is a metal salt or mixtures selected from nitrates, hydrated nitrates, chlorides, hydrated chlorides, sulfates, hydrated sulfates, formates, acetates, hypophosphites, and mixtures thereof, added in a solute state Examples include water-soluble nickel and/or cobalt components, e.g. water-soluble nickel and/or cobalt salts such as nitrates, sulfates, acetates, chlorides, formates or mixtures thereof of nickel and/or cobalt as well as nickel hypophosphite.

In one embodiment, the promoter metal (L) metal precursor is a water-soluble nickel component, e.g. nickel nitrate, nickel sulfate, nickel acetate, nickel chloride, or mixtures thereof. In another embodiment, the metal precursor is a nickel compound which is at least partly in the solid state, e.g., a water-insoluble nickel compound such as nickel carbonate, nickel hydroxide, nickel phosphate, nickel phosphite, nickel formate, nickel sulfide, nickel molybdate, nickel tungstate, nickel oxide, nickel alloys such as nickel-molybdenum alloys, Raney nickel, or mixtures thereof. In a third embodiment, the metal precursor containing (L) is a water-soluble nickel sulfate solution. In yet another embodiment, promoter metal compound is added to the water-soluble reagent, e.g., an iron component in the solute state selected from iron acetate, chloride, formate, nitrate, sulfate and mixtures thereof.

In one embodiment, the promoter metal (L) precursor is a nickel sulfate aqueous solution.

Sulfiding Agent Component: In one embodiment, the sulfiding agent is elemental sulfur by itself. In another embodiment, the sulfiding agent is a sulfur-containing compound which under prevailing conditions, is decomposable into hydrogen sulphide. In yet a third embodiment, the sulfiding agent is $H_2S$ by itself or in $H_2$.

The sulfiding agent is present in an amount in excess of the stoichiometric amount required to form the catalyst. In another embodiment, the amount of sulfiding agent represents a sulfur to Group VIB metal mole ratio of at least 3 to 1 to produce a sulfided catalyst from the catalyst precursor. In a third embodiment, the total amount of sulfur-containing compound is generally selected to correspond to any of about 50-300%, 70-200%, and 80-150%, of the stoichiometric sulfur quantity necessary to convert the metals into for example, $CO_9S_8$, $MoS_2$, $WS_2$, $Ni_3S_2$, etc.

In one embodiment, the sulfiding agent is selected from the group of ammonium sulfide, ammonium polysulfide $((NH_4)_2S_x)$, ammonium thiosulfate $((NH_4)_2S_2O_3)$, sodium thiosulfate $(Na_2S_2O_3)$, thiourea $(CSN_2H_4)$, carbon disulfide $(CS_2)$, dimethyl disulfide (DMDS), dimethyl sulfide (DMS), tertiarybutyl polysulfide (PSTB) and tertiarynonyl polysulfide (PSTN), and mixtures thereof. In another embodiment, the sulfiding agent is selected from alkali- and/or alkaline earth metal sulfides, alkali- and/or alkaline earth metal hydrogen sulfides, and mixtures thereof. The use of sulfiding agents containing alkali- and/or alkaline earth metals may require an additional separation process step to remove the alkali- and/or alkaline earth metals from the spent catalyst.

In one embodiment, the sulfiding agent is ammonium sulfide in aqueous solution. An aqueous ammonium sulfide solution can be synthesized from hydrogen sulfide and ammonia—common refinery off-gases. This synthesized ammonium sulfide is readily soluble in water and can easily be stored in aqueous solution in tanks prior to use. Since ammonium sulfide solution is more dense than resid, it can be separated easily in a settler tank after reaction.

Optional Component—Binder Material: In one embodiment, a binder is optionally included in the process for making the catalyst. Generally, the binder material has less catalytic activity than the catalyst composition (without the binder material) or no catalytic activity at all. Consequently, by adding a binder material, the activity of the catalyst composition may be reduced. Therefore, the amount of binder material to be added in the process generally depends on the desired activity of the final catalyst composition. Binder amounts from 0-95 wt. % of the total composition can be suitable, depending on the envisaged catalytic application. In another embodiment, binder can be optionally added in the range of 0.5-75 wt. % of the total composition.

The binder materials can be added to the metal precursors either simultaneously or one after the other. Alternatively, the metal precursors can be combined together and subsequently a binder material can be added to the combined metal precursors. It is also possible to combine part of the metal precursors either simultaneously or one after the other, to subsequently add the binder material and to finally add the rest of the metal precursors either simultaneously or one after the other. Furthermore, it is also possible to combine the binder with metal precursors in the solute state and to subsequently add a metal precursor at least partly in the solid state.

In one embodiment, the binder material is mixed with a Group VIB metal and/or a promoter metal, e.g., a Group VIII non-noble metal, prior to being mixed with the bulk catalyst composition and/or prior to being added during the preparation thereof. Compositing the binder material with any of these metals in one embodiment is carried out by impregnation of the solid binder with these materials.

Optional binder materials include any materials that are conventionally applied as a binder in hydroprocessing catalysts. Examples include silica, silica-alumina, such as conventional silica-alumina, silica-coated alumina and alumina-coated silica, alumina such as (pseudo)boehmite, or gibbsite, titania, zirconia, cationic clays or anionic clays such as saponite, bentonite, kaoline, sepiolite or hydrotalcite, or mixtures thereof. In one embodiment, binder materials are selected from silica, colloidal silica doped with aluminum, silica-alumina, alumina, titanium, zirconia, or mixtures thereof. In one embodiment, the catalyst comprises a refractory oxide material which comprises 50 wt. % or more titania, on oxide basis.

These binders may be applied as such or after peptization. It is also possible to apply precursors of these binders that, during the process are converted into any of the above-described binders. Suitable precursors are, e.g., alkali metal aluminates (to obtain an alumina binder), water glass (to obtain a silica binder), a mixture of alkali metal aluminates and water glass (to obtain a silica alumina binder), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof.

In one embodiment with the incorporation of a binder or binders, the catalyst is of the formula $(M^t)_a(L^u)_b(Z)_t(S^v)_d (C^w)_e (H^x)_f(O^y)_g(N^z)_h$, with Z representing titanium and optionally one or more elements selected from aluminum, silicon, magnesium, zirconium, boron, and zinc.

In one embodiment where alumina is used as a binder, the alumina binder has a surface area ranging from 100 to 400 $m^2/g$, with a pore volume ranging from 0.5 to 1.5 ml/g measured by nitrogen adsorption. In one embodiment where titania is used as a binder, the titania has an average particle size of less than 50 microns. In a second embodiment, the titania binder has an average particle size of less than 5 microns. In a third embodiment, the titania binder has an average particle size of greater than 0.005 microns. In a fourth embodiment, the titania binder has a BET surface area of 10 to 700 $m^2/g$.

Sulfur Additive Component: The use of the sulfur additive is optional. In one embodiment, at least a sulfur additive (also referred to as "sulfiding additive") is added in mixture with any of the sulfiding agents described above, the (M)-metal precursor, the (L)-metal precursor, separately or in a mixture with all reagents. The role of the sulfur additive is to increase the incorporation of sulfur in the catalyst in one embodiment, and in another embodiment, increasing the stability of the catalyst activities.

In one embodiment, the amount of sulfur additive (used interchangeably with additives) ranges from 5 to 50 wt. % of the amount of sulfur introduced in the catalyst (via the sulfiding agent). In a second embodiment, this amount ranges from 10 to 40 wt. % of the amount of sulfur introduced in the catalyst. In a third embodiment, from 15 to 30 wt. %. The sulfur additive can be added either in the pure state or dissolved in a suitable solvent, e.g., water.

In one embodiment, the sulfur additive is selected from the group of thiodiazoles, thio acids, thio amides, thiocyanates, thio esters, thiophenols, thiosemicarbazides, thioureas, and mixtures thereof. Examples include but are not limited to, thiobenzoic acid, 2-thiocresol, 3-thiocresol, 4-thiocresol, 3,3'-thiodipropionic acid, 3,3'-thiodipropionitrile, 2,3,6-trimethyl thiophenol, methyl thioglycolate, 4-methyl-3-thiosemicarbazide, naphthalene-2-thiol, phenyl isothiocyante, 2-phenyl thiophenol, thioacetamide, thiobenzamide, 2,6-dimethyl thiophenol, 3,5-dimethyl thiophenol, 2,2'-dinitrodiphenyl disulfide, 2,5-dithiobiurea, ethyl thioglycolate, 2-methoxy thiophenol, 3-methoxy thiophenol, 2-methyl-5-mercapto-1,3,4-thiadiazole, amidinothiourea, 2-amino-5-ethylthio-1,3,4-thiadiazole, 2-amino-5-mercapto-1,3,4-thiadiazole, 3-amino-5-mercapto-1,2,4-triazole, 2-amino thiophenol, benzene-1,3-dithiol, 3-chlorothiophenol and 2,5-dimercapto-1,3,4-thiadiazole (D.M.T.D.).

In another embodiment, the sulfur additive is selected from the group of mercapto alcohols. Examples are compounds of formula HS—$CH_2$—$CH_2OH$ (2-mercaptoethanol) and HS—$CH_2$—C($C_6H_5$)H—OH (1-mercapto-2-phenyl-2-ethanol). In yet another embodiment, the sulfur additive is one of dialkyl sulfides (such as di-n-butyl sulfides, di-tert-butyl sulfides), dihydroxyalkyl sulfides (such as thiodiethylene glycol (S($CH_2CH_2OH$)$_2$), thiodipropylene glycol), diaryl sulfides (such as diphenyl sulfide), diaralkyl sulfides (such as dibenzyl sulfide), alkyl ethers, thiophenols (such as thioanisole), cyclic thio ethers and their substituted derivatives (such as ethylene sulfide, thiophene, thiazole, thiopyrone, thioxanthone, thioxanehydrol, 1,4-thioxane), dimethyl sulfoxide, ethylthiol ethanol, thioglycolic acid, dithioglycol, and diethanol disulfide.

In one embodiment, the sulfur additive is a commercially available sulfur-containing compound, e.g., tert-nonylpolysulfide such as TPS-374 from Atofina Company or catalyst presulfiding agent SulfiZol™ from Lubrizol Corp.

In another embodiment, the sulfur additive is sulphur in powder form (flowers of sulphur), which can be used in suspension either alone or mixed with another sulphur compound (e.g. an organic polysulphide) in exemplified weight proportions of 5 to 90% polysulphide and 95 to 10% elementary sulphur in one example, and 20 to 50% polysulphide and 80 to 50% elementary sulphur in another example.

In another embodiment, the sulfur additive is selected from the group of dimethyl sulphide DMS, dimethyl disulphide DMD, diethanol disulfide or 2,2-dithiobis ethanol (DEODS) soluble in water, glycols, and polyglycols. In one example, the sulfur additive is DEODS mixed in formic acid or a methyl formate organic solution.

Surfactant Component: The use of a surfactant component is optional. In one embodiment, a surfactant is used. The surfactant can be any suitable surfactant which use favorably improves the bulk catalyst's characteristics, including its dispersion, metal surface area, morphology and the like, employed in an amount ranging from in an amount of 0.001 to 5 wt. %. In a second embodiment, the amount of surfactant ranges from 0.005 to 3 wt. %. In a third embodiment, from 0.01 to 2 wt. %.

In one embodiment, the optional surfactant is added to the metal precursor components either simultaneously or one after the other. Alternatively, the metal precursors can be combined together first and subsequently the surfactant can be added to the combined metal precursors. In another embodiment, the surfactant is added to the hydrocarbon transforming agent to enhance the micro-emulsion formation. In one embodiment, the amount of surfactant added to the hydrocarbon transforming agent ranges from 0.005 to 3 wt. %. In another embodiment, it ranges from 0.01 to 2 wt. %.

In yet one embodiment as known in the art, the surfactant can be added to the feedstock to the hydroprocessing operation, e.g., a heavy oil feed stream to be hydroconverted, instead of or in addition to the addition of the surfactant to the hydrocarbon transforming agent. If the surfactant is solely added to the hydroconversion feedstock, the amount to be added ranges from 0.001 to 0.05 wt. % of the feed in one embodiment and 0.005 to 0.01 wt. % in a second embodiment. See work by East China University of Science teaching the addition of enhancing additives to facilitate the intensification of oil cracking, including reducing the formation of coke on the catalyst and increasing the liquid yield by 1-2.8% (Acta Petrolei Sinica, Vol. 19, Issue 4, pp. 36-44, ISSN 10018719). Also see work by Perm State Technical University teaching the use of surfactants in the refining of oil distillates, with yield increases of 1.3-4.2% (Khimiya I Tekhnologiya Topilv I Masel, Issue 3, Year 1997, pp. 20-21, ISSN 00231169 and later publications by same authors).

The surfactant can be at least one of anionic surfactants, zwitterionic surfactants, amphoteric surfactants, nonionic surfactants, cationic surfactants, and combinations thereof. In one embodiment, the non-ionic surfactant is selected from polyoxyethylenesorbitan monolaurate, polyoxyethylenated alkyphenols, polyoxyethylenated alkyphenol ethoxylates, and the like. Suitable cationic surfactants include quarternary long-chain organic amine salts, quarternary polyethoxylated long-chain organic amine salts, and the like. In another embodiment, the surfactant is selected from the group of solvent materials having a high surface tension property such as ethylene carbonate, benzophenone; benzyl cyanide, nitrobenzene, 2-phenylethanol, 1,3-propanediol, 1,4-butanediol, 1,5-pentanediol, diethyleneglycol, triethyleneglycol, glycerol, dimethyl sulfoxide (DMSO), N-methyl formamide, N-methylpyrrolidone, and mixtures thereof. In yet another embodiment, the surfactant comprises a surfactant having a high surface tension such as N-methyl pyrrolidone, which surfactant in some embodiments, helps enhance the conversion yield of at least 1%. Other examples of surfactants include acetonitrile, acetone, ethyl acetate, hexane, diethyl ether, methanol, ethanol, acetyl acetone, diethylcarbonate, chloroform, methylene chloride, diethyl ketone, and mixtures thereof.

In one embodiment, the surfactant is a cationic surfactant, e.g., a water-soluble cationic amine selected from the group of cetyl trimethyl ammonium bromide, cetyl trimethyl ammonium chloride, dodecyl trimethyl ammonium amine, nonyl trimethyl ammonium chloride and dodecyl phenol quaternary amine soaps.

In one embodiment, the surfactant is an organic compound containing at least one nitrogen atom or phosphorous for a catalyst with a carbosulfide phase with enhanced catalytic activities. The amount of the N-containing/P-containing organic additive to be added generally depends on the desired activity of the final catalyst composition.

In another embodiment, the surfactant is an ammonium or phosphonium of the formula $R_1R_2R_3R_4Q+$, wherein Q is nitrogen or phosphorous and wherein at least one of $R_1$, $R_2$, $R_3$, $R_4$ is aryl or alkyl of 8-36 carbon atoms, e.g., $-C_{10}H_{21}$, $-C_{16}H_{33}$ and $-C_{18}H_{37}$, or combinations thereof, the remainder of $R_1$, $R_2$, $R_3$, $R_4$ being selected from the group consisting of hydrogen, alkyl of 1-5 carbon atoms and combinations thereof. Examples cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidbdecylammonium. The compound from which the above ammonium or phosphonium ion is derived may be, for example, the hydroxide, halide, silicate, or mixtures thereof.

In one embodiment, the surfactant is an N-containing organic additive selected from the group of aromatic amines, cyclic aliphatic amines, polycyclic aliphatic amines, and mixtures thereof. In another embodiment, the N-containing organic additive is selected from compounds containing at least one primary, secondary, and/or tertiary amine group such as hexamethylenediamine, monoethanolamine, diethanolamine, triethanolamine and N,N-dimethyl-N'-ethylethylenediamine; amino alcohols, such as, for example, 2(2-amino ethyl amino)ethanol, 2(2-aminoethoxy)ethanol, 2-amino-1-butanol, 4-amino-1-butanol, 2,2-diethoxyethylamine, 4,4-diethoxybutylamine, 6-amino-1-hexanol, 2-amino-1,3-propanediol, 3-amino-1,2-propanediol, 3-amino-1-propanol; and Amino alkoxy-silanes, such as, for example, (3-glycidoxypropyl)trimethoxysilane, 3-(2-aminoethylamino)propyltrimethoxysilane and (3-aminopropyl)trimethoxy-silane, and mixtures thereof.

In one embodiment, the stabilizer/surfactant is an organic carboxylic acid surfactant. In one embodiment, the surfactant is citric acid. In another embodiment, the surfactant is penta-decanoic acid, decanoic acid, or other similar long chain acids. In yet another embodiment, the surfactant is alginic acid. In a fourth embodiment, the surfactant is maleic acid.

Component—Hydrocarbon Transforming Agent: The hydrocarbon transforming agent transforms the catalyst precursor (hydrophilic) to an oil based active catalyst (hydrophobic) of the formula $(M)_a(L)_b(S)_d(C)_e(H)_f(O)_g(N)_h$. The nature of the hydrocarbon is not critical, and can generally include any hydrocarbon compound, acyclic or cyclic, saturated or unsaturated, unsubstituted or inertly substituted, and mixtures thereof, and which hydrocarbon compound is liquid at ordinary temperatures.

In one embodiment, the weight ratio of the water base catalyst precursor to the hydrocarbon compound is in the range of 1:10 to 5:1. In a second embodiment, the weight ratio of the water base catalyst precursor to the hydrocarbon compound is in the range of 1:5 to 1:1. In one embodiment with the present of a promoter metal Group VIII, the weight ratio of the Group VIII and Group VIB metal components to the hydrocarbon oil medium is in the range of 1:1 to 1:500. In another embodiment, in the range of 1:2 to 1:150. In a third embodiment, from 1:3 to 1:100. In a fourth embodiment, from 1:5 to 1:50. In a fifth embodiment, from 1:7 to 1:20.

In one example, the hydrocarbon compound is selected from the group of straight chain saturated acyclic hydrocarbons as octane, tridecane, eicosane, nonacosane, or the like; straight chain unsaturated acyclic hydrocarbons as 2-hexene, 1,4-hexadiene, and the like; branched chain saturated acyclic hydrocarbons as 3-methylpentane, neopentane, isohexane, 2,7,8-triethyldecane, and the like; branched chain unsaturated acyclic hydrocarbons such as 3,4-dipropyl-1,3-hexadiene-5-yne, 5,5-dimethyl-1-hexene, and the like; cyclic hydrocarbons, saturated or unsaturated, such as cyclohexane, 1,3-cyclohexadiene, and the like; and including such aromatics as cumene, mesitylene, styrene, toluene, o-xylene, or the like. In yet another embodiment, the hydrocarbon compound is derived from petroleum, including admixtures of petroleum hydrocarbons characterized as virgin naphthas, cracked naphthas, Fischer-Tropsch naphtha, light cat cycle oil, heavy cat cycle oil, and the like, typically those containing from about 5 to about 30 carbon atoms.

In one embodiment, the hydrocarbon compound has a kinetic viscosity ranging from 2 cSt to 15 cSt@100° C. In a second embodiment, the hydrocarbon oil has a kinematic viscosity of at least 2 cSt at 100° C. In a third embodiment, from 5 cSt to 8 cSt at 100° C. The hydrocarbon oil causes a transformation of the catalyst precursor from a water based to an oil based. In one embodiment, the ratio of the Group VIB metal (M) to hydrocarbon is less than 1.0. In a second embodiment, the ratio is less than 0.5. In a third, less than 0.1. In one embodiment with the kinematic viscosity of the hydrocarbon transforming agent being below 2 cSt @ 100° C. or above about 15 cSt @ 100° C., the transformation of the catalyst precursor results in catalyst particles agglomerating or otherwise not mixing. In one embodiment, the hydrocarbon compound is a vacuum gas oil (VGO).

Other Optional Components: If desired, materials including other metals can be added in addition to the components described above. These materials include any material that is added during conventional hydroprocessing catalyst preparation. Suitable examples are phosphorus compounds, boron compounds, additional transition metals, rare earth metals or mixtures thereof. Suitable phosphorus compounds include ammonium phosphate, phosphoric acid, or organic phosphorus compounds. Suitable additional transition metals that can be added to the process steps include are, e.g., rhenium, ruthenium, rhodium, iridium, chromium, vanadium, iron, cobalt, platinum, palladium, and cobalt. In one embodiment, the additional metals are applied in the form of water-insoluble compounds. In another embodiment, the additional metals are added in the form of water soluble compounds. Apart from adding these metals during the process, it is also possible to composite the final catalyst composition therewith the optional materials. It is, e.g., possible to impregnate the final catalyst composition with an impregnation solution comprising any of these additional materials.

In one embodiment to help reduce coking, the additional optional component added is phosphorous in the form of phosphomolybdic acid having an atomic ratio of P/Mo ranging from about 0.08:1 to 0.01:1.

Method for Making Catalyst: In one embodiment, the preparation method allows systematic varying of the composition and structure of the catalyst by controlling the relative amounts of the elements, the types of the feed components (reagents) including surfactant additives if any, the length and severity of the various reactions.

In the invention, sulfiding (sometimes referred to as "pre-sulfiding") of the metal precursor(s) to form a sulfided catalyst precursor is performed prior to the introduction of the catalyst into a hydroprocessing reactor (thus ex-situ sulfiding).

In one embodiment, the first step is forming a Group VIB metal component in solution. In one example, aqueous ammonia is brought into contact with at least a Group VIB metal compound, such as molybdenum oxide or tungsten oxide, forming a water soluble oxygen-containing compound such as ammonium molybdate or tungstate.

In one embodiment with the optional use of a least a promoter metal, the Group VIB metal component in solution is brought into contact with at least a promoter metal component in solution. The addition of the promoter metal can lead to precipitate, which does not interfere with sulfiding process as the sulfiding can be done in slurry or fully dissolved form. In one embodiment, the Group VIB metal is sulfided first before it is brought into contact with at least a promoter metal component in solution.

In one embodiment, the mixture is kept at a sufficient high pH to complex the promoter metal forming a precipitate. In yet another embodiment, the mixing is carried out at a sufficient temperature and pH, at which the promoter metal compound and the Group VIB metal compound precipitate. In another embodiment, at least one metal component is added in the solid state and at least one metal component is added in a solute state. In another embodiment and depending on the promoter metal used, the mixture is kept at a pH of at least 8 to prevent a precipitate from forming.

In one embodiment, the mixing of Group VIB and promoter metal is in the carried out at 0-300° F. in one embodiment, between 25-200° F. in a second embodiment, and in the range of 70-180° F. in a third embodiment. If the temperature is below the boiling point of the protic liquid, such as 212° F. in the case of water, the process is generally carried out at atmospheric pressure. Above this temperature, the reaction is generally carried out at increased pressure, such as in an autoclave. In one embodiment, the precipitation reaction is at between 0 to 3000 psig. In a second embodiment, between 100 to 1000 psig.

In one embodiment, the mixture is kept at its natural pH during the reaction step. The pH is in the range of 0-12 in one embodiment, between 2-10 in a second embodiment, and 3-8 in a third embodiment. Changing the pH can be done by adding base or acid to the reaction mixture, or adding compounds, which decompose upon temperature increase into hydroxide ions or $H^+$ ions that respectively increase or decrease the pH. Examples include urea, nitrites, ammonium hydroxide, etc. In one embodiment, the pH is controlled such that the pH at the beginning of the reaction differs from the final pH after precipitation.

In one embodiment, the reaction of the Group VIB metal compound (sulfided or unsulfided) and the promoter metal components is carried out with water-soluble nickel, molybdenum and tungsten components under conditions described above. The solution may further comprise other promoter metal components, e.g., cobalt or iron components such as $Co(NO_3)_2$, $Co(CH_3CO_2)_2$, or chromium components. In one embodiment, the reaction of the Group VIB and the optional promoter metal component is in an organic solvent with added water under $H_2$-containing gas pressure, with the organic solvent being a hydrocarbon mixture of alkanes and aromatic compounds.

In one embodiment, the reaction is carried with the appropriate metal precursors resulting in precipitate combinations of nickel/molybdenum/tungsten, cobalt/molybdenum/tungsten or nickel/cobalt/molybdenum/tungsten. These types of precipitates have a higher surface area than precipitates prepared from the Group VIB metal and the promoter metal, e.g., a group non-noble VIII metal. In one embodiment with multiple Group VIII precursors being employed, nickel and cobalt make up at least 50 wt. % of the total of Group VIII non-noble metal components. In another embodiment with multiple Group VIB precursors being employed, molybdenum and tungsten make up at least 50 wt. % of the total of Group VIB metal components.

In one embodiment, the reaction of Group VIB metal and promoter metal components is carried out with water-soluble nickel and molybdenum, wherein nickel is used at a ratio of 0.1-1 atom per Mo atom. In a second embodiment, at a ratio of 0.5 nickel atom per each Mo atom.

The metal precursors can be added to the reaction mixture in solution, suspension or as such. If soluble salts are added as such, they will dissolve in the reaction mixture and subsequently be precipitated. In one embodiment, the solution is heated optionally under vacuum to effect precipitation and evaporation of the water.

In one embodiment, in addition to the metal precursors, at least a binder material can be optionally added to the mixture. Binder material can be any of the optional binders described above and/or a precursor thereof. If a precursor binder material is added in the form of the solution, process condition can be adjusted so that precipitation of the binder may occur.

In one embodiment, at least a surfactant is added in this step. Surfactant materials to be added including but not limited to N-containing/P-containing organic additives, any of cationic, anionic and nonionic surfactants, as well as other additives including phosphorus-containing compounds, boron-containing compounds, silicon-containing compounds, fluorine-containing compounds, additional transition metal compounds, rare earth metal compounds, or mixtures thereof can be added during precipitation step in a similar way to that described for the above materials.

In one embodiment, the mixture is subject to activation radiation to further improve the catalyst characteristics. In another embodiment, the mixture is subject to high intensity ultrasound treatment or electromagnetic energy to reduce the particle size and thus the catalyst characteristics.

In one embodiment prior to the sulfidation step, the mixture is optionally isolated from the liquid using methods known in the art such as filtration, centrifugation, decantation, or combinations thereof. In another embodiment prior to the sulfidation step, the mixture is optionally treated with a sulfur additive or a commercially available catalyst presulfiding agent. In yet another embodiment prior to the sulfidation step, the mixture is optionally treated with at least an N-containing/P-containing organic additive.

In one embodiment, an aqueous solution of a Group VIB metal compound, e.g., ammonium p-tungstate or a molybdate such as ammonium molybdate, is brought into contact with a sulfiding agent in the sulfidation step. In another embodiment with at least a promoter metal L, the mixture formed from the reaction of the metal precursors is converted into a sulfided catalyst precursor upon contact with the sulfiding agent. In yet another embodiment with a promoter metal L, the aqueous solution of a Group VIB metal compound is first brought into contact with a sulfiding agent to form a sulfided metal precursor, which is subsequently promoted with a promoter metal compound. In yet another embodiment, the Group VIB metal compound and the promoter metal L are brought into contact with a sulfiding agent separately to form sulfided metal precursors, then the sulfided metal precursors are subsequently brought into contact forming the catalyst precursor.

In one embodiment in addition to the sulfiding agent, at least a sulfur additive and optionally other additives known in the art, e.g., phosphorous-containing promoters, etc., can be separately or in a mixture with the sulfiding agent to increase the incorporation of sulfur in the catalyst. In one embodiment, instead of or in addition to the addition of surfactants in other steps, at least a surfactant is added in the sulfiding step.

In one embodiment, the sulfidation is carried out at a temperature ranging from room temperature to 300° F. and for ½ hr. to 24 hours. In another embodiment, the sulfidation is at 50° F. to 250° F. In yet another embodiment, the sulfidation is between 50-200° F. In a fourth embodiment, the sulfidation is between 60-150° F. In one embodiment, the sulfidation is at between 0 to 3000 psig. In a second embodiment, between 100 to 1000 psig. In a third embodiment, the sulfidation pressure is less than 500 psig.

In yet another embodiment, the sulfidation is carried out at a temperature ranging from 50° F. to 300° F., from 10 minutes to 5 days, and under a $H_2$-containing gas pressure. If the sulfidation temperature is below the boiling point of the sulfiding agent, such as 60-70° F. in the case of ammonium sulfide solution, the process is generally carried out at atmospheric pressure. Above the boiling temperature of the sulfiding agent/optional components, the reaction is generally carried out at an increased pressure, such as in an autoclave.

In yet another embodiment, the sulfidation is with an aqueous ammonium sulfide solution at a temperature between ambient and 250° F., and in the presence of at least a sulfur additive selected from the group of thiodazoles, thio acids, thio amides, thiocyanates, thio esters, thio phenols, thiosemicarbazides, thioureas, mercapto alcohols, and mixtures thereof.

In one embodiment with the sulfiding step being carried out in aqueous solution, the resultant product of the sulfiding step is a slurry in an aqueous solution. Analyses will show that the catalyst precursor product of the sulfiding step is catalytically active, although not in optimum form for use in hydroprocessing operations.

In one embodiment, the process can be extended to include blending metal sulfide powders, e.g., molybdenum sulfide powders, into the catalyst precursor to further enhance the activity of the catalyst.

In one embodiment after sulfiding, the catalyst precursor is optionally isolated from the liquid using methods known in the art such as filtration, centrifugation, decantation, or combinations thereof, under an inert atmosphere comprising any of nitrogen, refinery gas, a gas having little or no oxygen, and mixtures thereof. In the next step, the catalyst precursor powder is impregnated again with the sulfiding agent, e.g., ammonium sulfide $(NH_4)_2S$ solution, and/or optional sulfur additives.

In one embodiment after sulfiding, the catalyst precursor is subject to an optional ammonia removal step. Ammonia removal has a favorable effect upon catalyst activity because ammonia is a depressant to the activity of a hydrogenation catalyst. Ammonia removal is beneficial to catalyst activity because any ammonia present can be adsorbed at metal sites and may constitute a catalyst poison. In one embodiment, the sulfided water based slurry from the sulfiding step is subject to a simple aqueous phase ammonia flashing step by cooling and depressurizing the slurry stream. Ammonia can be flashed off together with any generated hydrogen sulfide and hydrogen present in the system.

The hydrogen containing gas in the above steps of the process can be substantially pure hydrogen, or can be mixtures of hydrogen with other gases such as nitrogen, helium, methane, ethane, carbon monoxide or hydrogen sulfide.

In one embodiment with the use of molybdenum as the Group VIB metal and nickel as the Group VIII promoter, the sulfiding is controlled for a S/Group VIB ratio of about 3 (i.e., $MoS_x$ wherein x=3), wherein the crystalline of Group VIB system is destroyed to form a finely dispersed, amorphous molybdenum sulfide catalyst precursor. In one embodiment, the surface area of the catalyst precursor at this stage is less than 3 $m^2/g$. In the activation step at increasing temperature and/or reducing pH and in the presence of the sulfiding agent, e.g., hydrogen gas containing $H_2S$, it is believed that the value of x in catalyst precursor $MoS_x$ is now 2, which is highly active for hydrogenation and oxidation reactions, and characterized by a high surface area of greater than 50 $m^2/g$ and highly pyrophoric.

Forming Oil-Based Bulk Catalyst Composition: In this step, the catalyst precursor is mixed with a hydrocarbon compound and is transformed into an oil based catalyst of the formula $(M^t)_a(L^n)_b(S^v)_d(C^w)_e(H^x)_f(O^y)_g(N^z)_h$. In one embodiment, it is believed that in the transformation process, the hydrophilic sulfide catalyst precursor is transformed into an active hydrophobic sulfide species in the form of fine dispersion of small aggregates.

In one embodiment, instead of or in addition to the addition of surfactants in other steps, at least a surfactant is added to the catalyst precursor and hydrocarbon compound in this transformation phase.

In one embodiment, the mixing is continuous in a high shear mode, e.g., from 100 to 1600 RPM, and from about 10 minutes to 24 hours, forming a homogeneous slurry. The mixing can be done within a continuous stirred tank, or it can be done by other means including an in-line static mixer (e.g., with a plurality of internal baffles or other elements), a dynamic high-shear mixer (vessel with propeller for very high turbulent, high shear mixing), or a combination of the above for turbulent mixing condition. As used herein, turbulent mixing conditions means sufficient mixing for a flow with a Reynolds number of at least 2000. In a second embodiment, turbulent mixing means sufficient mixing for a Reynolds number of at least 3000. In a third embodiment, a Reynolds number ranging from 3200 to 7200.

In one embodiment, the reaction time in this step ranges from 30 minutes to 3 hours. In another embodiment, the reaction time ranges from 1 to 2 hrs.

In one embodiment, the process conditions in the transformation step are sufficient to form the final catalyst, in terms that at least a portion of the water is in the liquid. In one embodiment, "a portion of the water" means that at least 50% of the water in the mixture is maintained in a liquid phase. In a second embodiment, "a portion of the water" means that less than 90% of the water in the mixture is maintained in the liquid phase. In a third embodiment, less than 70% of the water in the mixture is maintained in the liquid phase. In a fourth embodiment, less than 50% of the water in the mixture is maintained in the liquid phase.

In one embodiment, the temperature of the transformation step is maintained at a temperature of 50-600° F. In a second embodiment, the temperature is maintained at a temperature of 100-500° F. In a third embodiment, the transformation temperature ranges from 150-450° F. In a fourth embodiment, the transformation temperature ranges from 200 to 475° C.

In one embodiment, the pressure of the transformation step is maintained in the range of 0-1000 psig. In a second embodiment, it is between 200-500 psig. In a third embodiment, from 300-450 psig.

In one embodiment with the use of a light oil such as naphtha (with a boiling point above the boiling point of water) as the hydrocarbon transforming agent, in order to keep the oil at liquid at a high temperature, e.g., a temperature above 200° C. (392° F.), the transformation step is carried out at a pressure in the range of about 15 MPa (2,175 psi) to about 20 MPa (2,900 psi). With the use of naphtha, after the transformation step, the light oil can be conveniently vaporized in order to obtain the concentrated slurry catalyst. The vaporized oil can be recycled for subsequent reuse in the catalyst transformation step or elsewhere in the hydroprocessing system. In one embodiment, the removal of the light naphtha is done by distillation. In another embodiment, by decantation or phase separation. Additionally, with the use of a light oil as a transforming agent, there is less agglomeration and the concentrated slurry catalyst can be subsequently quickly dispersed into heavy oil feed in a hydroconversion process.

In one embodiment, the mixing is under an inert atmosphere comprising any of nitrogen, refinery gas, a gas having little or no oxygen, and mixtures thereof. In another embodiment, the mixing is under a $H_2$-containing gas pressure. In a third embodiment, hydrogen gas is added at a relatively low rate before and after the reactor in which the hydrocarbon/catalyst precursor mixing takes place. In one embodiment, the $H_2$ flow to the transformation step is kept at 100 to 2000 SCFB ("Standard Cubic Feet per Barrel" of hydrocarbon compound feed to the reactor). In a second embodiment, the $H_2$ flow ranges from 300 to 1000 SCFB. In a third embodiment, the $H_2$ flow ranges from 200 to 500 SCFB.

Ammonia removal from the oil based catalyst slurry can be carried out after the transformation step in one embodiment. The catalyst stream in one embodiment is heated prior to depressurization and ammonia vaporization.

The resultant slurry mixture can go directly to a hydroprocessing reactor without the need for water removal, but the presence of water will take up unnecessary room in a hydroprocessing reactor. In one embodiment, the oil based catalyst slurry mixture is passed to high pressure separator to remove water from the slurry catalyst prior to entering a hydroprocessing reactor.

Hydrogen may be added following reactor or directly into the high pressure separator to flash off water and residual $H_2S$ in the catalyst slurry. The addition of hydrogen helps change water from liquid to vapor phase, permitting separation from oil slurry in a high pressure separator. In one embodiment, it is desirable to remove water because it might interfere with the reactivity of the catalyst. In one embodiment, the amount of water remaining in the slurry catalyst is less than 10 wt. %. In a second embodiment, less than 5 wt. %. In a third embodiment, between 1 to 3 wt. %.

The process steps described herein are in no way limited to the use of any particular apparatus. Any of the reactors for use in the process can be batch, semi-batch, or continuously stirred tank reactors (CSTRs), and can be a vessel equipped heating means having a mechanical stirrer, or a static mixer, or by means of a recirculating pump. The process steps can be operated in any of continuous, batch mode, or combinations there of for some of the steps, using a single-stage reactor or multiple-stage reactors. The components (feed streams) can be introduced simultaneously, or sequentially in any order to the reactor. The term "feed stream" refers to both continuous and batch processed.

FIG. 1 illustrates the steps involved in one embodiment of the process. In a reactor (mixing tank) 10, at least a group VIB metal precursor such as ammonium heptamolybdate in aqueous solution (feed stream 1) is mixed with at least a promoter metal precursor such as nickel sulfate in aqueous solution (feed stream 2), forming an intermediate mixture. In one embodiment, the reaction time in the mixing tank 10 ranges from about 1 hour to 10 hours. The temperature in one embodiment is maintained at 30° C. to 100° C. at a pressure ranging from 100 to 3000 psig. In one embodiment, the weight ratio of nickel (or cobalt) to molybdenum in the group VIII/group VIB precursor feed streams ranges from about 1:100 to about 1:2. In a second embodiment, the nickel/molybdenum weight ratio ranges from about 1:25 to 1:10.

In one embodiment (not shown), instead of feeding ammonium heptamolybdate in aqueous solution to the reactor 10, metal oxide dissolved in aqueous ammonia solution is used as a feed to the process. In this embodiment, there is an additional mixing zone (not shown) wherein a group VIB metal oxide is dissolved in water containing ammonia at a temperature ranging from 30° C. to 100° C., and at a pressure from atmospheric pressure to about 100 psig. The dissolved metal oxide (e.g., $MoO_3$) in aqueous ammonia is converted to a group VIB metal precursor feed according to the following reaction:

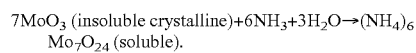

The catalyst precursor from reactor 10 is moved in line 3 to the next reactor/mixing tank 20, wherein the catalyst precursor is sulfided with a sulfiding agent, e.g., ammonium sulfide $(NH_4)_2S$ for a period of time 5 minutes to 2 hours. In one embodiment, the sulfidation is carried out at a temperature ranging from room temperature to 70° C., and at 0 psig. Optional components (not shown), e.g., N-containing and/or P-containing organic additive, sulfur additives, etc., can be added to reactor 20 to increase the incorporation of sulfur in the catalyst precursor formed in this step.

The water is kept in liquid phase in reactor 20. In one embodiment (not shown), water is changed to vapor phase after reactor 20 in order to flash off the water.

In the next transformation step, the sulfided catalyst precursor from reactor 20 is moved in line 5 to reactor 30, wherein the catalyst precursor slurry is mixed with hydrocarbon oil feed 6, forming an embodiment of the bulk catalyst. Hydrogen is continuously added to the mixture reaction zone, ranging from 300 SCFB ("Standard Cubic Feet per Barrel," meaning per barrel of hydrocarbon feed) to about 2000 SCFB. The pressure of the reaction zone generally ranges from about 100 psig to about 3000 psig. Temperature of the reactor generally ranges from 150 to 300° C. Reactor 30 is a CSTR with high shear mixing of greater 500 RPM ("Revolutions Per Minute") to maintain homogenous slurry in the reactor. The hydrocarbon feed 6 in one embodiment has a kinetic viscosity of 4-10 cSt @ 100° C. The resultant slurry mixture is one embodiment of the active catalyst composition in admixture with the hydrocarbon oil and having the formula $(M^r)_a(L^u)_b(S^v)_d(C^w)_e(H^x)_f(O^y)_g(N^z)_h$.

In one embodiment, the active catalyst composition is moved in line 7 to a storage tank (not shown), wherein the catalyst slurry is continuously mixed in storage tank to maintain a homogenous slurry in a hydrogen atmosphere with little or no oxygen. In this way, the catalyst activity and stability are maintained.

The catalyst composition is useful for upgrading carbonaceous feedstocks which include atmospheric gas oils, vacuum gas oils (VGO), deasphalted oils, olefins, oils derived from tar sands or bitumen, oils derived from coal, heavy crude oils, synthetic oils from Fischer-Tropsch processes, and oils derived from recycled oil wastes and polymers. The catalyst composition is useful for but not limited to hydrogenation upgrading processes such as thermal hydrocracking, hydrotreating, hydrodesulfurization, hydrodenitrification, and hydrodemetalization.

In one embodiment, the bulk catalyst composition is used in a heavy oil upgrading process. As shown in FIG. 1, the catalyst is moved in line 7 to a hydrocracking reactor or ebullated bed catalytic reactor 40, wherein the active catalyst slurry is in contact with a heavy oil 8 (with optional additives such as modifiers, stabilizers, etc.) and a hydrogen-containing gas (not shown) for sufficient time and at appropriate temperature under hydrocracking conditions. The concentration of the active slurry catalyst in the heavy oil feed 8 in one embodiment ranges from about 100 to 20,000 ppm, expressed as weight of metal (molybdenum) to weight of heavy oil feedstock. In one embodiment for a higher conversion for sulfur, nitrogen and metal removal, as well as the higher cracking conversion, a higher catalyst to oil ratio is used. In one embodiment with the use of the catalyst composition, over 95% demetalation conversion and 1000° F. cracking conversion of the heavy oil can be achieved at appropriate process conditions, with a coke yield of less than 1%.

Stream 9 contains combined gas and liquid products (light oil and unconverted heavy oil) as well as catalyst. The resultant light oil is separated from the solid bulk catalyst and unconverted heavy oil in a high pressure separator (not shown). The light oil is sent to a fixed bed reactor typically used for hydrotreating of oil (not shown) to further remove sulfur and nitrogen, and to improve product qualities.

It should be noted that the process can be carried out in either a batch and/or continuous mode. In the operation, high shear mixing is desirable to prevent the aqueous slurry from settling or forming thick gel.

In one embodiment, the process is carried out as a batch process with a single reactor being used for the steps, e.g., forming a mixture, sulfiding, and forming an oil-soluble catalyst in the same equipment, with the steps being carried out in sequence after the completion of the previous step. In another embodiment, some of the steps are done in batch mode, and some of the steps are done in the continuous mode. In one embodiment, sulfiding is done in a continuous mode.

Figure 2:
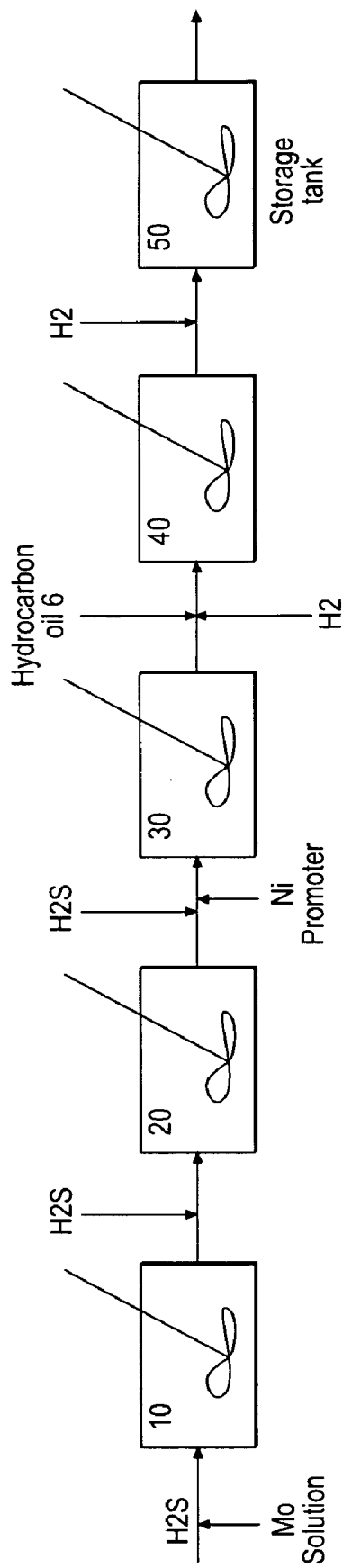
FIG. 2 illustrates a diagram of a process to prepare an embodiment of the catalyst composition in continuous mode.

In another embodiment, the process is a batch process with multiple reactors in series and with each step being carried out in a separate CSTR. In a third embodiment, the process is continuous with the precipitate or catalyst precursor effluents from one step being moved to the next step in the process. FIG. 2 illustrates an embodiment of a process to prepare and activate the bulk catalyst in a continuous. Reactor 10 (at about 100 to 200° F., and 200 to 600 psig) is for the formation of an aqueous solution of a Group VIB metal compound, e.g., ammonium molybdate. In reactor 20, the Group VIB metal precursor is sulfided (at about 100 to 200° F., and 200 to 600 psig). In reactor 30 (at about 100 to 200° F., and 200 to 600 psig), the sulfided Group VIB precursor is promoted with a nickel compound. Reactor 40 is for the transformation of the catalyst precursor into an oil-based bulk catalyst (at about 300 to 500° F., and 300 to 600 psig). In tank 50 (at about 400 to 600° F., and 300 to 600 psig), high shear mixing is employed in order to maintain the oil-based catalyst as a homogenous slurry. The catalyst slurry can be further processed to form a concentrated catalyst slurry.

Figure 3:
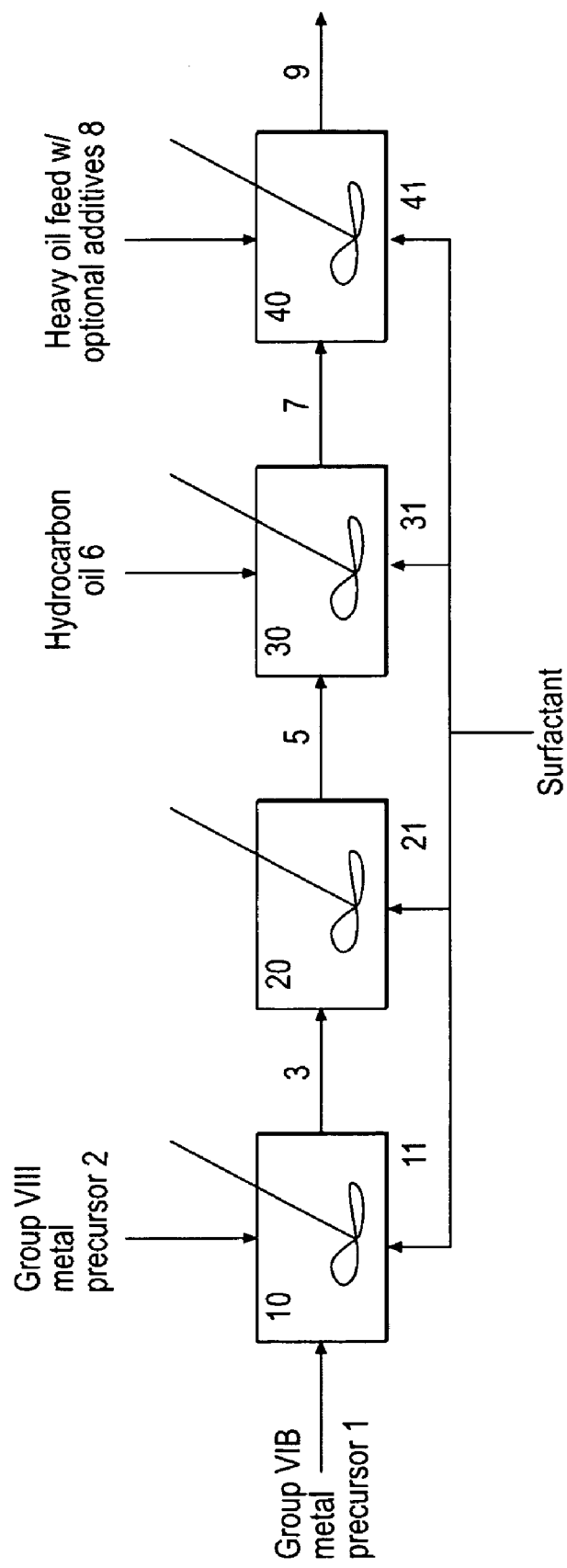
FIG. 3 illustrates the steps involved in another embodiment for preparing the catalyst composition, wherein at least a surfactant is added to at least one of the process steps.

FIG. 3 illustrates another embodiment of the process for making the bulk catalyst, with at least a surfactant can be added to any step of the process in FIG. 1 to control the morphology and dispersion of the bulk catalyst. In the figure, feed streams 11, 21, 31, and 41 containing at least a surfactant can be added to any of the steps in the process.

Figure 4:
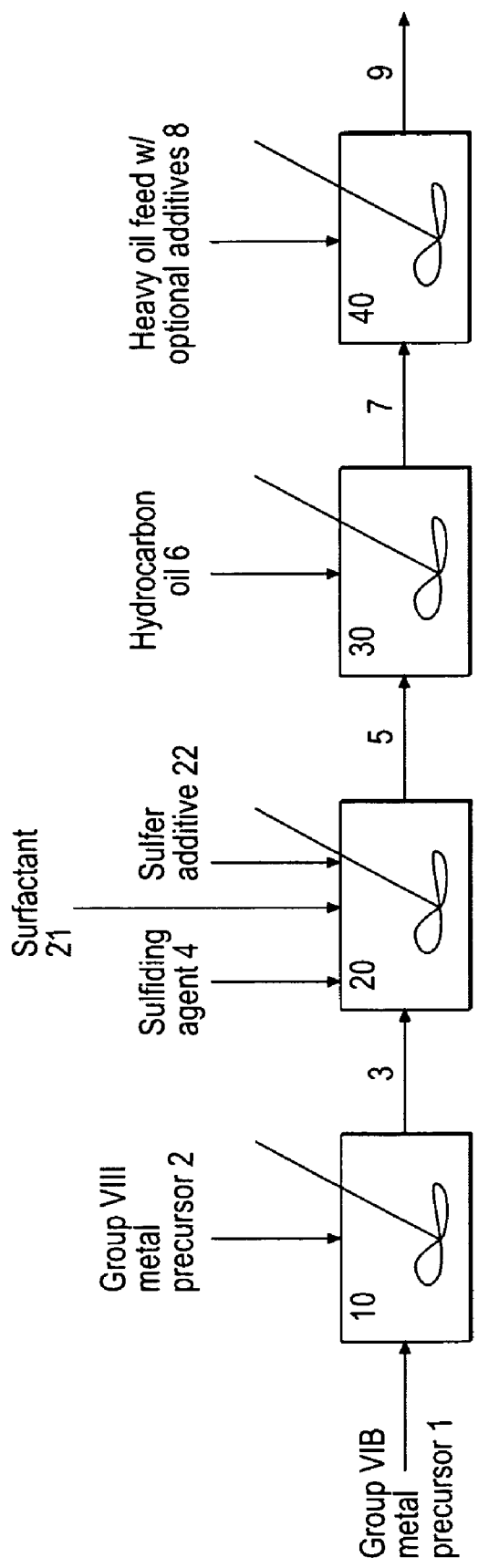
FIG. 4 illustrates the steps involved in another embodiment for preparing the catalyst composition, wherein at least a surfactant is added to at least one of the process steps.

FIG. 4 illustrates the steps involved in yet another embodiment of the process, wherein at least at least a sulfur additive is added to the sulfidation step. As shown in the figure, sulfur additives (stream 22) and optionally, at least a surfactant (stream 21) including but not limited to N-containing and/or P-containing organic additive, sulfur additives, etc., can be added to reactor 20 to increase the incorporation of sulfur in the catalyst precursor formed in this step. The sulfur additives 22 can be added separately, or mixed with the sulfiding agent 4, e.g., ammonium sulfide.

Characterization of the Catalyst: Characterization of the catalyst of the formula $(M^r)_a(L^u)_b(S^v)_d(C^w)_e(H^x)_f(O^y)_g(N^z)_h$ having improved morphology and dispersion characteristics can be performed using techniques known in the art, including elemental analysis, Surface Area analysis (BET), Particle Size analysis (PSA), Powder X-ray Diffraction (PXRD), Scanning Electron Microscopy (SEM), Energy Dispersive X-ray Analysis (EDS), and other methods. In one method, electron microscopy is used to complement the x-ray diffraction study. In another method, the surface area of the catalyst is determined using the BET method. In yet another method, scanning tunneling microscopy (STM) and density functional theory (DFT) can be used to characterize the catalyst. Elemental analysis of the catalyst will show presence of Molybdenum, Nickel, Sulfur, as well as Oxygen, Carbon, Hydrogen, and Nitrogen.

Characteristics of the Catalyst: In one embodiment, the catalyst has a pore volume of 0.05-5 ml/g as determined by nitrogen adsorption. In a second embodiment, the pore volume is 0.1-4 ml/g. In a third embodiment, from 0.1-3 ml/g. In a fourth embodiment, from 0.1-2 ml/g.

In one embodiment, the catalyst has a surface area of at least 5 m²/g. In a second embodiment, a surface area of at least 10 m²/g. In a third embodiment, a surface area of at least 50 m²/g. In a fourth embodiment, the surface area is greater than 100 m²/g as determined via the B.E.T. method. In a fifth embodiment, the catalyst has a surface area of greater than 200 m²/g. In a sixth embodiment, the catalyst is characterized by aggregates of crystallites of 10 to 20 angstrom, for an overall surface area greater than 100 m²/g.

In one embodiment, the catalyst has an effective suspended median particle size of 0.0005 to 1000 microns. In a second embodiment, the catalyst has a median particle size of 0.001 to 500 microns. In a third embodiment, a particle size of 0.005 to 100 microns. In a fourth embodiment, a particle size of 0.05 to 50 microns. In a fifth embodiment, the catalyst in the form of a dispersed suspension is characterized by a median particle size of 30 nm to 6000 nm. In a sixth embodiment, the catalyst has an average particle size in the range of 0.3 to 20 µm.

In one embodiment, the slurry catalyst has an average particle size ranging from colloidal (nanometer size) to about 1-2 microns. In another embodiment, the catalyst comprises catalyst molecules and/or extremely small particles that are colloidal in size (i.e., less than 100 nm, less than about 10 nm, less than about 5 nm, and less than about 1 nm), which in a hydrocarbon diluent, forming a slurry catalyst having "clusters" of the colloidal particles, with the clusters having an average particle size in the range of 1-20 microns with a surface area of greater than 100 m²/g. In yet another embodiment, the catalyst composition comprises single layer clusters of nanometer sizes, e.g., 5-10 nm on edge.

In one embodiment, the slurry catalyst is characterized by a crystallite size in the range of 10 to 20 angstrom with a surface area of greater than 100 m²/g. In another embodiment, the catalyst is characterized by a macro-structure aggregate with extremely high apparent pore volumes providing access to the heavy oil molecules to the catalyst. In one embodiment, it is believed that the crystallite growth is achieved with the rapid injection of the promoter Group VIII metal compound.

In one embodiment, the catalyst of the formula $(M^t)_a(L^u)_b(S^v)_d(C^w)_e(H^x)_f(O^y)_g(N^z)_h$ is characterized via X-ray powder diffraction (LRD or PXRD) as a poorly crystalline compound having broad diffraction peaks of low intensity. As used herein, a broad peak means a peak having a width at ½ height of more than 1 degree (in 2-θ scale).

In one embodiment, the catalyst is characterized as having at least one broad diffusion peak of >1° (in 2θ scale) at ½ height, at any of Bragg angles (2θ) 8 to 18°, 32 to 40° and 55 to 65° (from 0 to 70° 2θ scale). In another embodiment, the XRD pattern of the catalyst shows at least one broad peak having width at ½ height of >2 degrees (in 2θ scale), with the broad peak being at any of Bragg angles 8-18°, 32-40° and 55-65° in the 2θ scale. In yet another embodiment, XRD pattern of the catalyst shows that at least one broad peak of >=5 degrees wide at ½ height, with the broad peak being at any one of Bragg angles 8-18°, 32-40° and 55-65° in the 2θ scale.

Figure 5:
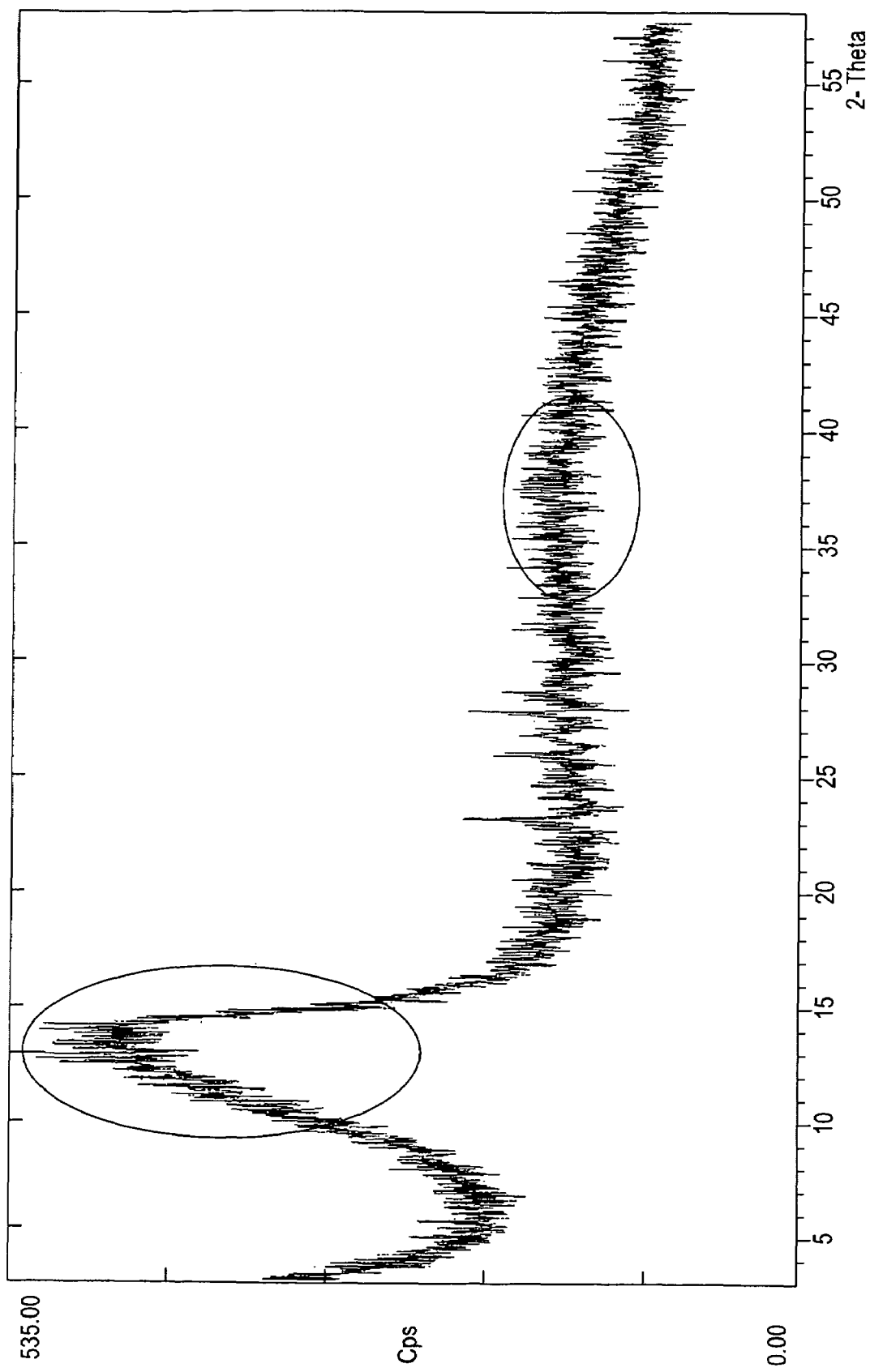
FIG. 5 shows the powder X-ray diffraction pattern of an intermediate catalyst precursor sample in one embodiment of the invention, showing a complex mixture of poorly crystalline compounds with broad spectra, multiple diffraction peaks of low intensity in the PXRD spectrum indicating small crystallite size.
Figure 6:
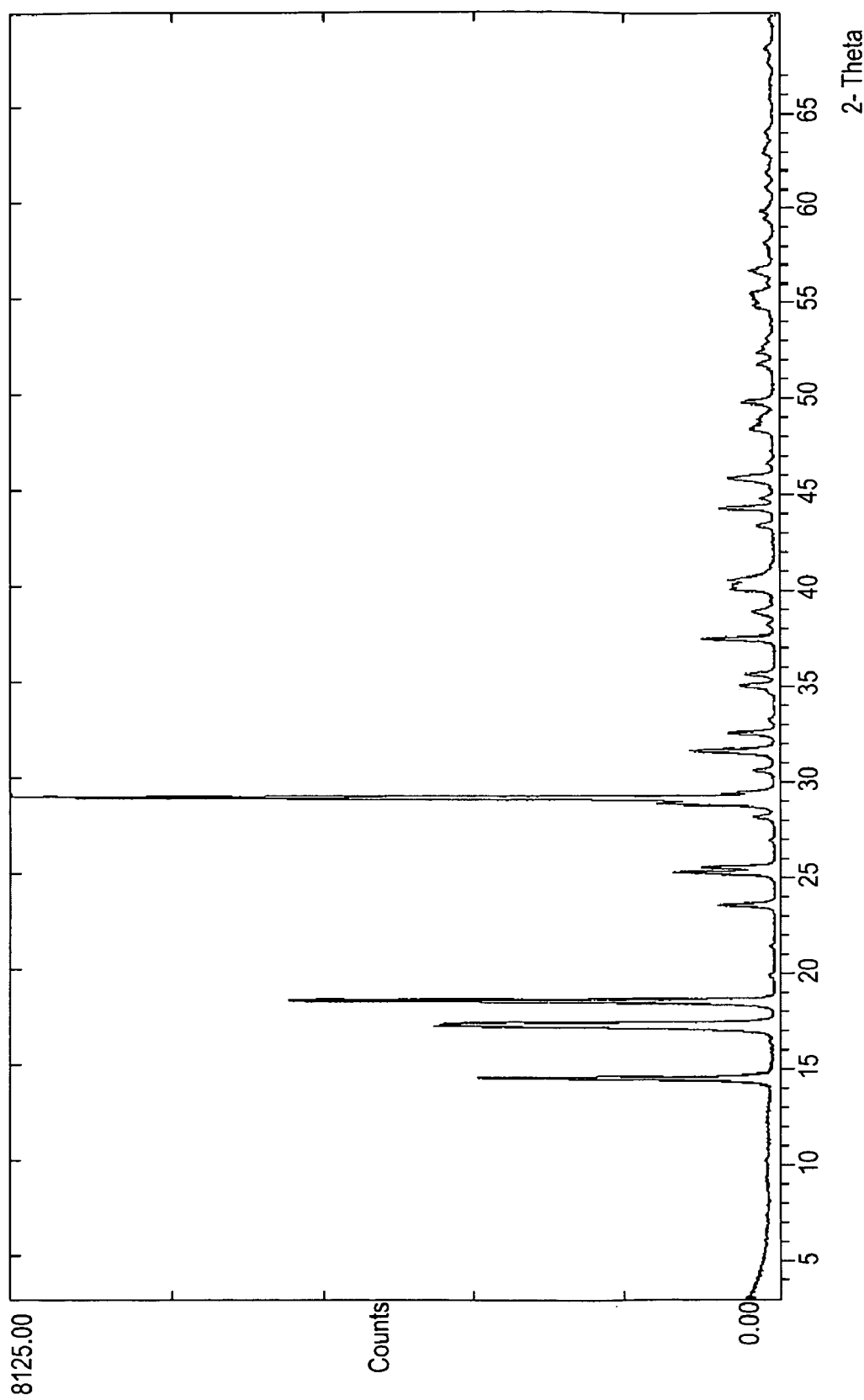
FIG. 6 is a PXRD spectrum of a comparative stock crystalline ammonium tetrathiomolybdate.

FIG. 5 shows the powder X-ray diffraction pattern of the intermediate catalyst precursor sample from one embodiment (solids filtered from the water-based pre-catalyst slurry of Example 1), with a broad peak appearing between 7-17 degrees and also between 33-43 degrees (in 2θ scale) and also as indicated by circles on the figure. For comparison, a PXRD spectrum of stock crystalline ammonium tetrathiomolybdate is shown in FIG. 6 with narrow and well-defined peaks being observed at 14-15 and 28 degrees (in 2θ scale).

Figure 7:
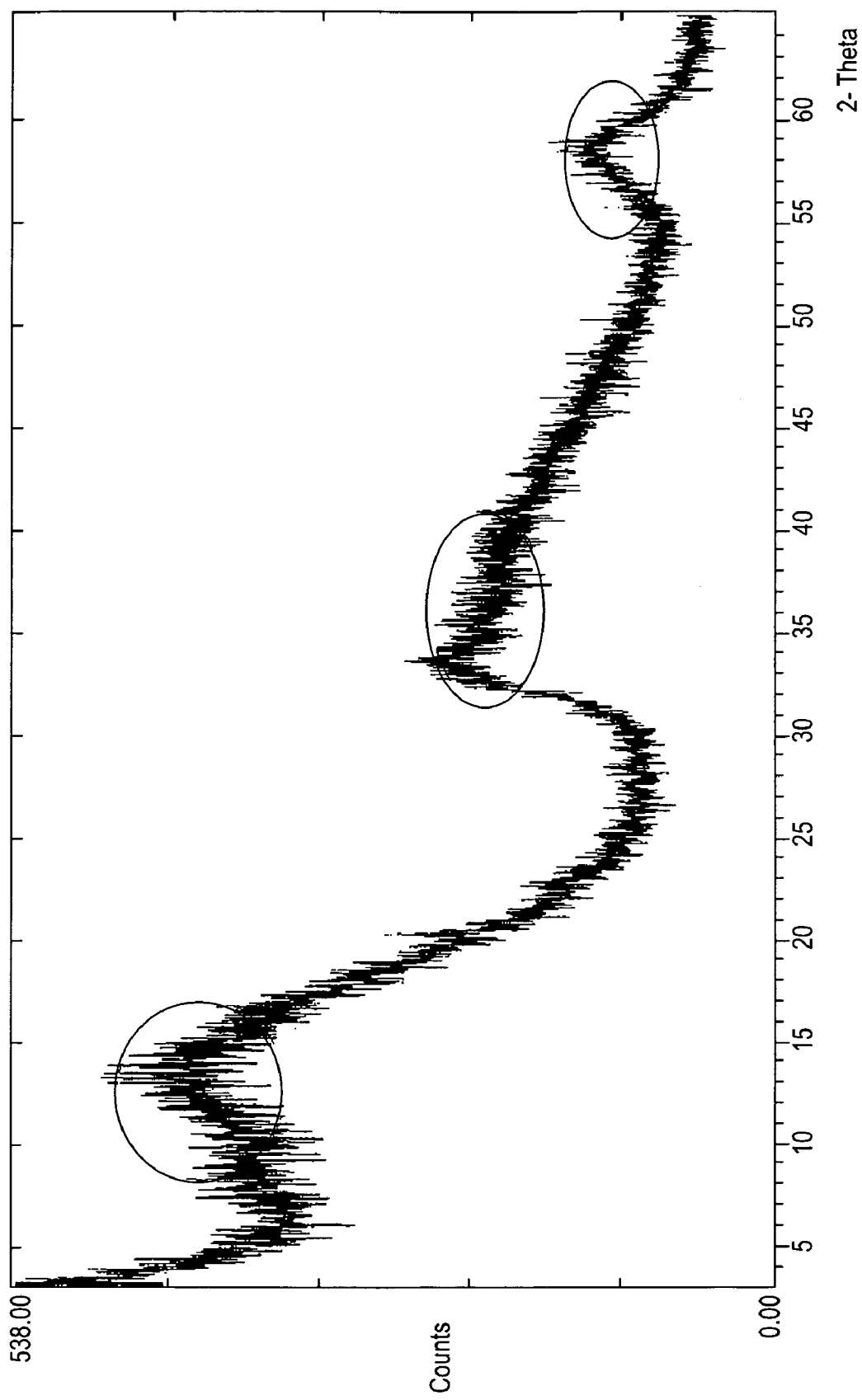
FIG. 7 shows the powder X-ray diffraction pattern of a catalyst sample in one embodiment of the invention, showing poor crystallinity with diffuse Bragg peaks (width of peaks at ½ height is >>1° in 2-theta scale).
Figure 8:
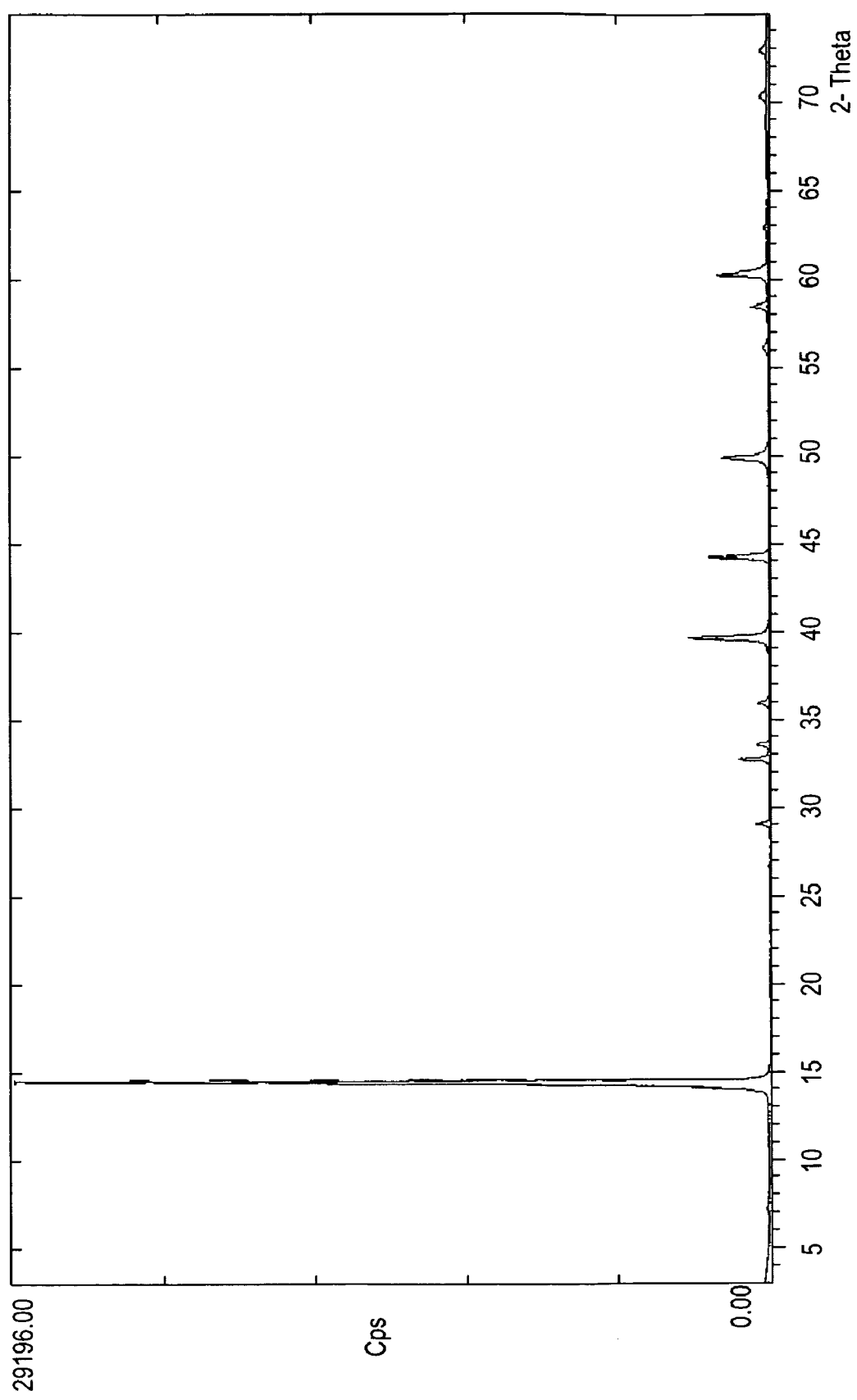
FIG. 8 shows a PXRD spectrum of a comparative crystalline MoS$_2$ with well-defined diffraction peaks of high intensity.

FIG. 7 shows the powder X-ray diffraction pattern of a catalyst sample in one embodiment prepared along the line of Example 10. X-ray diffraction analyses show that the catalyst exhibits poor crystallinity with diffuse/broad Bragg peaks (width of peaks at ½ height is >1° in 2-theta scale) at 8-15°, 32-40° and 55-65°. For comparison, FIG. 8 shows a PXRD spectrum of crystalline $MoS_2$ with well-defined diffraction peaks of high intensity. Catalytic activity of this material is much lower than that of a catalyst in an embodiment of the invention.

Figure 9:
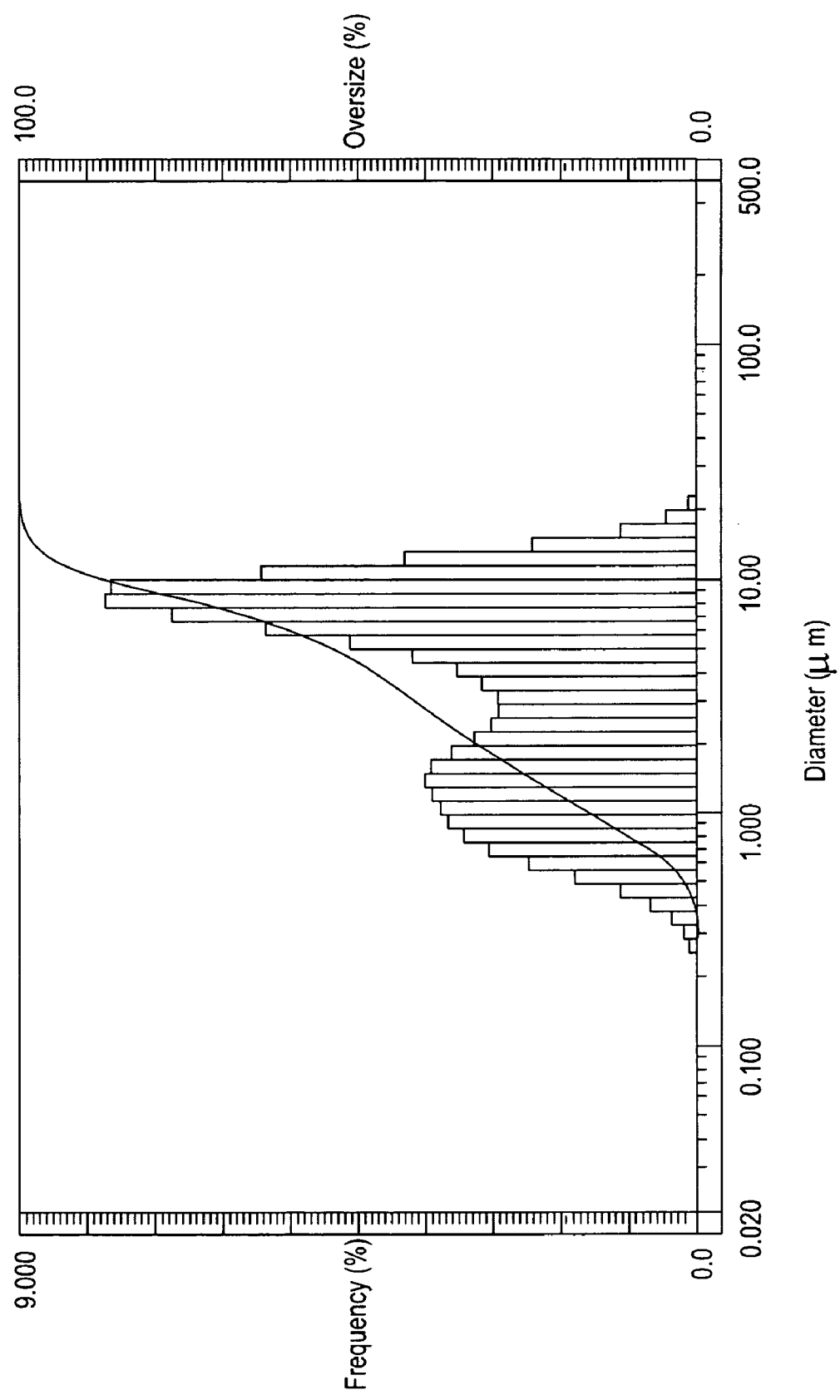
FIG. 9 shows volume-based particle size analysis of an embodiment of a catalyst compound of the invention.

FIG. 9 shows a volume-based PSA spectrum of extracted catalyst solids in one embodiment of the invention. Most of the particles fall into the 0.3 to 20 μm average particle size range, with peak distribution frequencies at 1 cm and 10 cm, suggesting a bi-modal type distribution.

Use of The Catalyst: The catalyst composition can be used in virtually all hydroprocessing processes to treat a plurality of feeds under wide-ranging reaction conditions such as temperatures of from 200 to 450° C., hydrogen pressures of from 5 to 300 bar (72 to 4351 psi or 0.5 to 30 MPa), liquid hourly space velocities of from 0.05 to 10 h$^{-1}$ and hydrogen treat gas rates of from 35.6 to 2670 m³/m³ (200 to 15000 SCF/B).

In one embodiment, the process pressure ranges from about 10 MPa (1,450 psi) to about 25 MPa (3,625 psi), about 15 MPa (2,175 psi) to about 20 MPa (2,900 psi), less than 22 MPa (3,190 psi), or more than 14 MPa (2,030 psi). The liquid hourly space velocity (LHSV) of the feed will generally range from about 0.05 h$^{-1}$ to about 30 h$^{-1}$, about 0.5 h$^{-1}$ to about 25 h$^{-1}$, about 1 h.$^{-1}$ to about 20 h$^{-1}$, about 1.5 h$^{-1}$ to about 15 h$^{-1}$, or about 2 h$^{-1}$ to about 10 h$^{-1}$. In some embodiments, LHSV is at least 5 h$^{-1}$, at least 11 h$^{-1}$, at least 15 h$^{-1}$, or at least 20 h$^{-1}$. In another embodiment, the LHSV ranges from 0.25 to 0.9 h$^{-1}$. In yet another embodiment, the LHSV ranges from 0.1 to 3 LHSV. The (contacting zone) process temperature ranges from about 410° C. (770° F.) to about 600° C. (1112° F.) in one embodiment, less than about 462° C. (900° F.) in another embodiment, more than about 425° C. (797° F.) in another embodiment.

The hydroprocessing can be practiced in one or more reaction zones and can be practiced in either countercurrent flow or cocurrent flow mode. By countercurrent flow mode is meant a process wherein the feedstream flows countercurrent to the flow of hydrogen-containing treat gas. The hydroprocessing also includes slurry and ebullated bed hydrotreating processes for the removal of sulfur and nitrogen compounds and the hydrogenation of aromatic molecules present in light fossil fuels such as petroleum mid-distillates, e.g., hydrotreating a heavy oil employing a circulating slurry catalyst.

The feeds for use in hydroprocessing processes using the catalyst may include petroleum and chemical feedstocks such as olefins, reduced crudes, hydrocrackates, raffinates, hydrotreated oils, atmospheric and vacuum gas oils, coker gas oils, atmospheric and vacuum resids, deasphalted oils, dewaxed oils, slack waxes, Fischer-Tropsch waxes and mixtures thereof. Specific examples range from the relatively light distillate fractions up to high boiling stocks such as whole crude petroleum, reduced crudes, vacuum tower residua, propane deasphalted residua, brightstock, cycle oils, FCC tower bottoms, gas oils including coker gas oils and vacuum gas oils, deasphalted residua and other heavy oils. In one embodiment, the feedstock is a $C_{10+}$ feedstock. In another the feedstock is selected from distillate stocks, such as gas oils, kerosenes, jet fuels, lubricating oil stocks boiling above 230° C., heating oils, hydrotreated oil stock, furfural-extracted lubricating oil stock and other distillate fractions whose pour point and viscosity properties need to be maintained within certain specification limits.

In one embodiment, the feedstocks contain a substantial amount of nitrogen, e.g. at least 10 wppm nitrogen, in the form of organic nitrogen compounds. The feeds can also have a significant sulfur content, ranging from about 0.1 wt. % to 3 wt. %, or higher. In yet another embodiment, the feedstock is a feed derived from crude oils, shale oils and tar sands as well as synthetic feeds such as those derived from the Fischer-Tropsch process, having initial boiling points of greater than 315° C. or higher. Specific examples include reduced crudes, hydrocrackates, raffinates, hydrotreated oils, atmospheric gas oils, vacuum gas oils, coker gas oils, atmospheric and vacuum resids, deasphalted oils, slack waxes and Fischer-Tropsch wax, and mixtures thereof. In one embodiment, the feedstock is a mixture of gas oil from a coker and vacuum distillation from conventional crudes, derived from distillation towers (atmospheric and vacuum), hydrocrackers, hydrotreaters and solvent extraction units, and may have wax contents of up to 50% or more. In yet another embodiment, the feed stock is selected from mid-distillates from fossil fuels such as light catalytic cycle cracking oils (LCCO); distillates derived from petroleum, coal, bitumen, tar sands, or shale oil; heavy catalytic cracking cycle oils (HCCO), coker gas oils, oils derived from recycled oil wastes and polymers, vacuum gas oils (VGO) and heavier resids, which contain several percent 3+ ring aromatics, particularly large asphaltenic molecules.

The hydrotreating processes using the catalyst may be suitable for making lubricating oil basestocks meeting Group II or Group III base oil requirements. In one embodiment, the catalyst is for use in a hydroprocessing process producing white oils. White mineral oils, called white oils, are colorless, transparent, oily liquids obtained by the refining of crude petroleum feedstocks.

The catalyst can be applied in any reactor type. In one embodiment, the catalyst is applied to a fixed bed reactor. In another embodiment, two or more reactors containing the catalyst may be used in series.

In one embodiment, the catalyst is added to the feedstock (catalyst to oil ratio) at a rate of 0.01 to 3 wt. %. In a second embodiment, at a rate of 0.25 to 2 wt. %. In a third embodiment, at a rate of 100 to 2000 ppm active metals, i.e., the group VIB metals "M" in the formula $(M^t)_a(L^u)_b(S^v)_d(C^w)_e(H^x)_j(O^y)_g(N^z)_h$. In a fourth embodiment, the catalyst is added to the feedstock at a sufficient rate for the total amount of Mo in the reaction zone reaches 0.005 to 0.05 wt. % (based on the total weight of the feedstock).

In one embodiment of a hydrogenation process employing the catalyst of the formula $(M^t)_a(L^u)_b(S^v)_d(C^w)_e(H^x)_f(O^y)_g(N^z)_h$, the heavy hydrocarbon is hydrogenated to a value of up to 90% by mass.

The catalyst of the formula $(M^t)_a(L^u)_b(S^v)_d(C^w)_e(H^x)_f(O^y)_g(N^z)_h$, even without the presence of promoter metal L in some embodiments (b=0), is characterized as giving excellent conversion rates in the upgrades of heavy oil, i.e., giving conversion rates of at least 90% in one embodiment, at least 92.5% in a second embodiment, and at least 95% in a third embodiment. In one embodiment of a heavy oil upgrade system employing the catalyst of the formula $(M^t)_a(L^u)_b(S^v)_d(C^w)_e(H^x)_f(O^y)_g(N^z)_h$, at least 98 wt. % of heavy oil feed is converted to lighter products. In a second embodiment, at least 98.5% of heavy oil feed is converted to lighter products. In a third embodiment, the conversion rate is at least 99%. In a fourth embodiment, the conversion rate is at least 95%. In a fifth embodiment, the conversion rate is at least 80%. As used herein, conversion rate refers to the conversion of heavy oil feedstock to less than 1000° F. (538° C.) boiling point materials.

EXAMPLES

The following illustrative examples are intended to be non-limiting. Unless specified otherwise, the catalytic activity of the catalysts prepared in the examples are tested for Hydrodenitrogenation (HDN), Hydrodesulfurization (HDS), as well as API gravity change and Microcrystalline Carbon Residue (MCRT). The results are presented in Table 2.

Example 1

Base Example 33.12 g of ammonium heptamolybdate tetrahydrate $((NH_4)_6Mo_7O_{24})$ was dissolved in 100 g of water in a glass vessel fitted with an overhead mechanical stirrer, and 14.1 g of concentrated ammonia solution (28 wt. % $NH_4OH$ in $H_2O$) was added. A solution of 8.1 g of nickel sulfate hexahydrate ($NiSO_4.6H_2O$) in 32 g of water was added to the first solution, all at ambient temperature, producing an emerald-green suspension. This suspension was heated to 70° C. under atmospheric pressure, and 101 g of ammonium sulfide ($(NH_4)_2S$) solution in water (40-44 wt. %) was added slowly, over the course of 45 minutes. After that, the mixture was heated with stirring for an additional 60 minutes. The volume of the reaction mixture was reduced in half on a rotary evaporator. The resulting water-based catalyst precursor was transformed to a final oil-based catalyst with medium cycle oil (MCO) and hydrogen in a pressure test autoclave in situ.

Example 2

Lower Ammonia Concentration

The procedure is similar to Example 1, using 33.12 g of ammonium heptamolybdate tetrahydrate to dissolve in 100 g of water in a glass vessel fitted with an overhead mechanical stirrer, and in this case 5 g of concentrated ammonia solution was added. A solution of 8.1 g of nickel sulfate hexahydrate in 32 g water was added to the first solution, all at ambient temperature, producing a light-green suspension. This suspension was heated to 70° C. under atmospheric pressure, and 101 g of ammonium sulfide solution was added slowly, over the course of 45 minutes. After that, the mixture was heated with stirring for an additional 60 minutes. The rest of the procedures and tests were similar to Example 1.

Example 3

Higher Ammonia Concentration 8.1 g of nickel sulfate hexahydrate was dissolved at ambient temperature in a mixture of 100 g of water and 15.3 g of concentrated ammonia solution in a glass vessel fitted with an overhead mechanical stirrer. Then, 33.12 g of ammonium heptamolybdate tetrahydrate was added to this mixture, forming a green suspension. Additional 11.4 g of ammonia solution was added, to yield a clear deep-blue solutions. This solution was heated to 70° C. under atmospheric pressure, and 101 g of ammonium sulfide solution in was added slowly, over the course of 45 minutes. After that, the mixture was heated with stirring for an additional 60 minutes. The rest of the procedures and tests were similar to Example 1.

Example 4

Very Low Ammonia Concentration Solid AHM Added 8.1 g of nickel sulfate hexahydrate was dissolved at ambient temperature in a mixture of 100 mL of water and 0.2 g of concentrated ammonia solution in a glass vessel fitted with an overhead mechanical stirrer. Then, 33.12 g of ammonium heptamolybdate tetrahydrate (AHM) was added to this mixture, forming a heavy light-green suspension. This solution was heated to 70° C. under atmospheric pressure, and 101 g of ammonium sulfide solution was added slowly, over the course of 45 minutes. After that, the mixture was heated with stirring for an additional 60 minutes. The rest of the procedures and tests were similar to Example 1.

Example 5

Slow Addition of Sulfiding Reagent

The procedure is similar to Example 2, using 33.12 g of ammonium heptamolybdate tetrahydrate to dissolve in 100 g of water with 5 g of concentrated ammonia solution, in a glass vessel fitted with an overhead mechanical stirrer. A solution of 8.1 g of nickel sulfate hexahydrate in 32 g water was added to the first solution, all at ambient temperature, producing a light-green suspension. This suspension was heated to 70° C. under atmospheric pressure, and 101 g of ammonium sulfide solution was added slowly, over the course of 120 minutes. After that, the reaction was stopped, and the rest of the procedures and tests were similar to Example 1.

Example 6

Rapid Addition of Sulfiding Reagent with Continued Heating

The procedure is similar to Example 5, except that the addition of 101 g of ammonium sulfide solution was done over 3 minutes. After that, the reaction was heated with stirring for an additional 120 minutes, and the rest of the procedures and tests were similar to Example 1.

Example 7

Rapid Addition of Sulfiding Reagent

The procedure is similar to Example 1, except that the addition of 101 g of ammonium sulfide solution was done over 10 minutes, and the reaction was stopped immediately after that. The rest of the procedures and tests were similar to Example 1.

Example 8

Higher Amount of Nickel Relative to Molybdenum—Mo:Ni=5:1

The procedure is similar to Example 2, using 33.12 g of ammonium heptamolybdate tetrahydrate to dissolve in 100 g of water mixed with 5 g of concentrated ammonia solution, in a glass vessel fitted with an overhead mechanical stirrer. A solution of 16.2 g of nickel sulfate hexahydrate in 32 g water was added to the first solution, all at ambient temperature, producing a green suspension. This suspension was heated to 70° C. under atmospheric pressure, and 100 g of ammonium sulfide solution (44 wt. %) was added slowly, over the course of 45 minutes. After that, the mixture was heated with stirring for an additional 60 minutes. The rest of the procedures and tests were similar to Example 1.

Example 9

Higher Amount of Nickel Relative to Molybdenum—Mo:Ni=3:1

The procedure was similar to Example 2, however 26.9 g of nickel sulfate hexahydrate solution in 39 g water, was used, producing a green-yellow suspension in the first step. Further procedures and tests were similar to Example 1.

Example 10

Large-Scale Synthesis of Oil Transformed Catalyst 2663 g of ammonium dimolybdate was combined with 1850 g of hot deionized (DI) water, and 1566 g of ammonium hydroxide solution (28% in water). The mixture was stirred and the reactor heated to ~140° F. After stirring for 20 minutes, a slurry of 673 g of nickel sulfate hexahydrate in 667 g of ammonium hydroxide (28% in water) was added. The mixture was stirred for four hours to dissolve any solids present. At this time the reaction mixture was a dark blue solution. An aqueous ammonium sulfide solution (41.9%) was added via a peristaltic tube pump with an addition speed of ~91 g.min-1. A total of 9061 g of ammonium sulfide solution was added over 100 minutes.

The bulk of the water-based catalyst precursor was subjected to batch transformation, by mixing 3796 g of aqueous based precursor and 3000 g of vacuum gas oil (VGO) in a 3-gallon autoclave and heating to 400° F. under 400 psi of nitrogen. Then hydrogen was added with 32 SCF/h and the reduction was carried out until no $H_2S$ was detected in the exit gas stream. This gave the final catalyst slurry was tested with medium cycle oil (MCO) and hydrogen in a pressure test autoclave for HDN/HDS/API/MCRT activity.

Example 11

Reduced Amount of Water, Hydrazine Additive 8.22 g of nickel sulfate hexahydrate were dissolved in 20 g of DI water, followed by the addition of 8.05 g of 28% ammonium hydroxide solution. A dark blue clear solution formed, pH=9.6 at 25° C. In a separate container 18 g of 28% ammonium hydroxide solution was mixed with 12 g of DI water. 33.13 g of ammonium heptamolybdate tetrahaydrate (AHM) was added to the above solution with stirring. The resulting mixture was heated in a water bath at 40° C. for 15 min followed by the addition of nickel sulfate solution. The pH was adjusted to 8.5 with 2 ml of concentrated ammonium hydroxide solution. As the result a clear solution was obtained. The solution was heated to 80° C. under ambient pressure. 94.48 g of ammonium sulfate solution (~50% wt.) was added slowly, over the course of 1 hr. The mixture was kept for additional 30 min at 80° C. followed by addition of 30 ml of hydrazine. The mixture was stirred for 2 hrs and then cooled down to room temperature. The final pH was 9.1. The rest of the procedures and tests were similar to Example 1, except the final product was sonicated for 5 min.

Example 12

Cobalt/Molybdenum Catalyst 6.03 g of 28% ammonium hydroxide solution was added to 44.01 g of DI water. The solution was heated to 60° C. 33.12 g of ammonium heptamolybdate tetrahydrate was added to the above solution and stirred till clear. The resulting solution was heated to 70° C., pH=6.6 at 60° C., and 92.03 g of concentrated ammonium sulfide (50 wt %) solution was added slowly over the course of 45 min followed by the addition of 7.8 g of cobalt acetate tetrahydrate. The mixture was stirred for another 2 hrs. at 75° C. and then cooled to room temperature. The rest of the procedures and tests were similar to Example 1.

Example 13

Nickel/Molybdenum/Tungsten Catalyst, 6 wt. % Mo/13 wt. % W/8 wt. % Ni 17.65 g of ammonium heptamolybdate tetrahydrate $((NH_4)_6Mo_7O_{24})$ was dissolved in 800 g of water in a glass vessel fitted with an overhead mechanical stirrer. 24.66 g of ammonium metatungstate hydrate was added to the above solution, pH=5.3 at 22° C. The pH was adjusted to 9.7 with 30 ml of 28 wt % ammonium hydroxide and the solution was heated to 90° C. 58.21 g of nickel sulfate hexahydrate (NiSO$_4$.6H$_2$O) was dissolved in 50 g of DI water, heated to 90° C., and added to the first solution. A resulting suspension was stirred at the temperature for 60 min. and then filtered hot to produce an apple green filter cake. The cake was washed with DI water and 109 g of it were mixed with 103 g of DI water, sonicated for 20 min., and heated to 70° C. under atmospheric pressure followed by addition of 100 g of ammonium sulfide ((NH$_4$)$_2$S) solution in water (50 wt. %) over the course of 60 minutes. After that, the mixture was heated with stirring for an additional 60 minutes. The rest of the procedures and tests were similar to Example 1.

Example 14

Catalyst Screening Studies

For the screening studies, the feed consists of highly aromatic FCC ("fluidized catalyst cracking") cycle oil which has the aromatic complexity of heavy oil but without the difficult-to-analyze asphalt. The operating conditions are as follows: 725° F. for reaction temperature, an equivalent of 3000 SCFB hydrogen to oil ratio, 1250 psig hydrogen partial pressure, 4 hours residence time, and catalyst to oil ratio equal to 1.8 percent by weight of feed.

These conditions, although consistent with those usually employed in cycle oil hydrogenation units are substantially more demanding because of the very low catalyst to oil ratio used in this study. summarizes both the operating conditions used as well as the quality of the screening feed. Table 2 presents the results of the experiments.

TABLE 1

Catalyst Screening Conditions and Feed Inspections

Catalyst Screening Conditions:

| | |
|---|---|
| Catalyst to Oil Ratio, wt/wt, % | 1.8 |
| Temperature Protocol: | |
| Ramp to CAT, Hrs (F./Min.) | 2.5 (5.0) |
| CAT, F. | 725 |
| Soak at CAT, Hrs | 4.0 |
| Quench, Time, | 1.0 |
| Minutes for 450 F. CAT | |
| Initial Pressure, psig | 1050 |
| Final Pressure, psig | Measure |
| Hydrogen partial pressure: | 1250 |
| Calculated @ CAT, psi | |
| Hydrogen/Oil Ratio, SCFB | 3000 |
| Feed: 50/50 Blend of LCO/MCO: | FEED |
| Inspections: | |
| API Gravity | 7.7 |
| Sulfur, PPM | 9580 |
| Nitrogen, PPM | 1670 |
| Refractive Index @ 20 C. | 1.6068 |
| Aromatic Carbon by ndM, % | 86.9 |
| Distillation, D2887 | |
| 10% @ | 534 |
| 50% @ | 666 |
| 90% @ | 847 |
| EP | 1141 |
| Characterization Factor | 10.26 |

Example 15

In this example, cetyl trimethylammonium bromide was used as the surfactant. 0.97 g of cetyl trimethylammonium bromide was mixed with 100 g DI water to yield a clear solution, followed by addition of 5 g of concentrated ammonia solution, 33.12 g of ammonium heptamolybdate tetrahydrate, and 8.1 of nickel sulfate hexahydrate, resulting in a light-blue mixture. This reaction mixture was heated to 70° C. under atmospheric pressure, and 92.04 g of ammonium sulfide solution (50 wt. %) was added slowly, over the course of 45 minutes. After that, the mixture was heated with stirring for an additional 60 minutes.

The rest of the procedures and tests were similar to Example 1, except the final product was sonicated for 10 min prior to testing. As noted in Table 1, the addition of the surfactant significantly improved the catalytic activity, in terms of both HDN (327 ppm for Example 2 vs. 531 ppm for Example 1) and HDS results (0.16 wt. % S for Example 2 vs. 0.22 wt. % S for Example 1).

Example 16

Citric acid was used as the surfactant. In this example, 35 g of citric acid was dissolved in 100 g DI water to yield a clear solution, pH=1.4, followed by heating to 40° C. and addition of 31.9 g of ammonium heptamolybdate tetrahydrate, pH=0.74 at 4 C. 8.1 of nickel sulfate hexahydrate was dissolved in 32 g of DI water, heated to 40° C. and added to the ammonium heptamolybdate/citric acid solution. The color of the solution changed from pale yellow to light green to emerald green. This resulting mixture was heated to 70° C. under atmospheric pressure, pH=1.45 at 60° C. 91.97 g of ammonium sulfide solution (50 wt. %) was added slowly, over the course of 30 minutes. After that, the mixture was heated with stirring for an additional 60 minutes, pH=9 at 70° C. The rest of the procedures and tests were similar to Example 1.

Example 17

Vanadium/Molybdenum Catalyst with Citric Acid as the Surfactant, 12 wt. % Mo/6 wt. % V 35 g of citric acid was dissolved in 100 g DI water to yield a clear solution, pH=1.4, followed by addition of 16.3 g of vanadyl sulfate hydrate, pH=0.6 at 21° C., and 17.65 g of ammonium heptamolybdate tetrahydrate, pH=0.7 at 21° C. The resulting mixture was heated to 70° C. under atmospheric pressure. 92 g of ammonium sulfide solution (50 wt. %) was added slowly, over the course of 30 minutes. After that, the mixture was heated with stirring for an additional 80 minutes. The rest of the procedures and tests were similar to Example 1.

Example 18

The catalytic activity of the catalyst precursors prepared in examples 1 and 10 (as comparative example), 15, 16, and 17 were tested for Hydrodenitrogenation (HDN), Hydrodesulfurization (HDS), as well as API gravity change and Microcrystalline Carbon Residue (MCRT).

In this example, samples of the water-based catalyst precursors from examples 1, 10, 15-17 were subjected to batch transformation, by mixing 3796 g of aqueous based precursor and 3000 g of vacuum gas oil (VGO) in a 3-gallon autoclave and heating to 400° F. under 400 psi of nitrogen. Then hydrogen was added with 32 SCF/h and the reduction was carried out until no H$_2$S was detected in the exit gas stream. This gave the final catalyst slurry was tested with medium cycle oil (MCO) and hydrogen in a pressure test autoclave for HDN/HDS/API/MCRT activity. The results are presented in Table 3.

TABLE 3

|  | Feed no catalyst | Feed + water no catalyst | 1 | 15 | 16 | 17 | 5 |
|---|---|---|---|---|---|---|---|
| API gravity | 7.5 | 10.5 | 13.3 | 13.8 | 13.4 | 12.3 | 14.7 |
| HDN, ppm N | 1730 | 1443 | 531 | 327 | 705 | 780 | 402 |
| HDS wt. % S | 0.93 | 0.79 | 0.22 | 0.16 | 0.34 | 0.53 | 0.17 |
| MCRT wt % | — | — | 0.98 | — | — | — | 0.91 |

Example 19

In this example, 5 g of maleic acid was dissolved in a mixture of 0.15 g of concentrated ammonia solution (28 wt. %) and 100 g deionized water. 8.11 g of nickel sulfate hexahydrate was dissolved in 32 g of deionized water, and this solution was combined with the first one, yielding a clear emerald-green solution. 33.1 g of solid ammonium heptamolybdate tetrahydrate was added, resulting in a blue-green solution. This mixture was heated to 70° C., and 92 g of 44 wt. % aqueous solution of ammonium sulfide was added with stirring. The reaction mixture was heated at 70° C. for 1 hr. After that, the reaction mixture was removed from the reaction flask and evaporated to reduce the volume in half.

Figure 10:
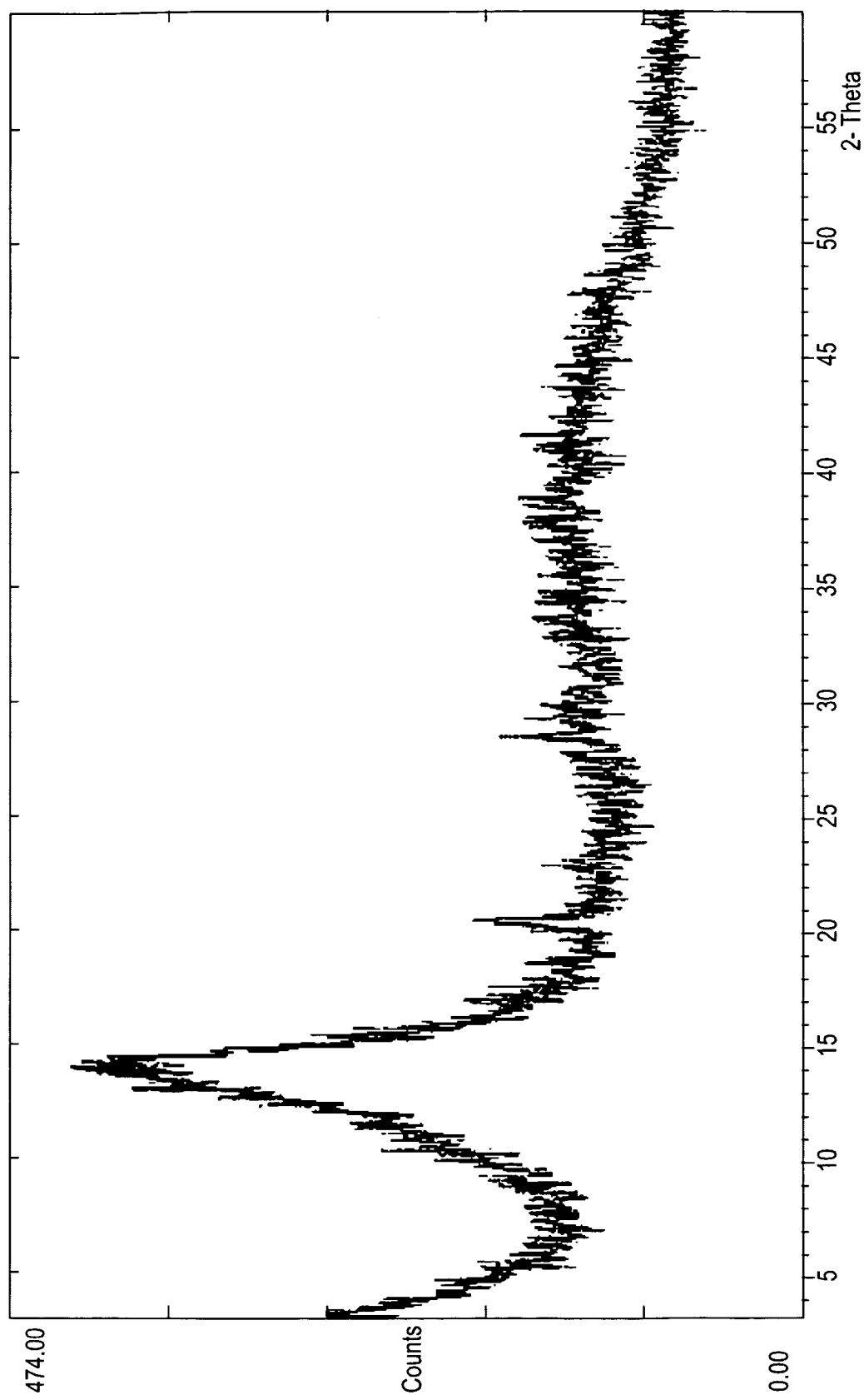
FIG. 10 shows the powder X-ray diffraction pattern of the catalyst sample prepared from Example 19, with the addition of a surfactant.

Activity of the resulting catalyst was tested as in Example 18 with other examples with the results being presented in Table 4 below. FIG. 10 shows the PXRD spectrum of the product catalyst solids prepared in this Example.

TABLE 4

| Refractive Index @ 20 C. | API 60/6 | Nitrogen wt ppm | Sulfur wt. % |
|---|---|---|---|
| 1.5870 | 10.4 | 1508.60 | 0.6087 |
| 1.5626 | 13.5 | 444.30 | 0.2446 |
| 1.5929 | 9.5 | 1568.50 | 0.5928 |

Example 20

Example 21 is a duplicate of Example 1, except that in addition to the ammonium sulfide solution in water, 4.8 g of DEODS (diethanol disulphide) containing 42.6% by weight sulphur mixed in 0.4 l of a 15% formic acid aqueous solution is added to the precipitate (emerald green suspension).

Procedures and tests similar to Example 1 can be conducted to evaluate the catalytic activity and life.

Example 22

Example 22 is a duplicate of Example 2, except that instead of DEODS, an equivalent sulfur stoichiometric quantity of a 50:50 by weight mixture of flowers of sulphur and ditert. dodecyl polysulphide suspended in 0.4 l of a 15% methyl formate solution in a white spirit is added to the precipitate. Procedures and tests similar to Example 1 can be conducted to evaluate the catalytic activity and life.

Example 23

Mo Only Catalyst Without Any Promoter 33.12 g of ammonium heptamolybdate tetrahydrate $((NH_4)_6Mo_7O_{24})$ was dissolved in 100 g of water in a glass vessel fitted with an overhead mechanical stirrer, and 14.1 g of concentrated ammonia solution (28 wt. % $NH_4OH$ in $H_2O$) was added. This mixture was heated to 70° C. under atmospheric pressure, and 101 g of ammonium sulfide $((NH_4)_2S)$ solution in water (40-44 wt. %) was added slowly, over the course of 45 minutes. After that, the mixture was heated with stirring for an additional 60 minutes. The volume of the reaction mixture was reduced in half on a rotary evaporator. The resulting water-based catalyst precursor was transformed to a final oil-based catalyst with medium cycle oil (MCO) and hydrogen in a pressure test autoclave in situ.

Example 24

The Mo-only catalyst of Example 23 was evaluated in converting a heavy oil feed consisting of highly aromatic FCC ("fluidized catalyst cracking") cycle oil with the following properties:

TABLE 5

| Properties | Feed |
|---|---|
| API Gravity | 2.9 |
| Sulfur, PPM | 1.01 |
| Nitrogen, PPM | 1600 |
| Refractive Index @ 20 C. | 1.6405 |
| MCRT, wt. % | 5 |

The operating conditions were as follows: 725° F. for reaction temperature, an equivalent of 3000 SCFB hydrogen to oil ratio, 1250 psig Hydrogen partial pressure, 4 hours residence time, and catalyst to oil ratio equal to 2 wt. % feed. The Mo-only catalyst of Example 23 was compared with a Mo-only catalyst prepared without the transformation step. The results are presented in Table 6.

TABLE 6

| Run | Refractive Index | API | Nitrogen wt. ppm | Sulfur % | MCRT % |
|---|---|---|---|---|---|
| Comparative example water based catalyst | 1.5956 | 7.8 | 727 | 0.5677 | 1.32 |
| Invention-oil transformed catalyst | 1.5860 | 8.8 | 694 | 0.5209 | 0.98 |

Example 25

Example 25 is a duplicate of Example 1, except that in addition to the ammonium sulfide solution in water, 4.8 g of DEODS (diethanol disulphide) containing 42.6% by weight sulphur mixed in 0.4 l of a 15% formic acid aqueous solution is added to the precipitate (emerald green suspension).

Procedures and tests similar to Example 1 can be conducted to evaluate the catalytic activity and life.

Example 26

Example 26 is a duplicate of Example 2, except that instead of DEODS, an equivalent sulfur stoichiometric quantity of a 50:50 by weight mixture of flowers of sulphur and ditert. dodecyl polysulphide suspended in 0.4 l of a 15% methyl formate solution in a white spirit is added to the precipitate. Procedures and tests similar to Example 1 can be conducted to evaluate the catalytic activity and life.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

TABLE 2

|  | Feed no catalyst | Feed + water no catalyst | 1 | 2 | 3 | 4 | 5 | 6 | 7 | 8 | 9 | 10 | 11 | 12 | 13 |
|---|---|---|---|---|---|---|---|---|---|---|---|---|---|---|---|
| API gravity | 7.5 | 10.5 | 13.3 | 13.1 | 13.0 | 12.8 | 13.1 | 13.2 | 12.7 | 13.0 | 13.3 | 14.7 | 14.3 | 13.6 | 12.9 |
| HDN, ppm N | 1730 | 1443 | 531 | 564 | 698 | 735 | 538 | 547 | 634 | 404 | 507 | 402 | 305 | 490 | 849 |
| HDS wt. % S | 0.93 | 0.79 | 0.22 | 0.24 | 0.19 | 0.21 | 0.22 | 0.23 | 0.29 | 0.17 | 0.17 | 0.21 | 0.15 | 0.28 | 0.29 |
| MCRT wt % | — | — | 0.98 | 1.00 | 1.16 | 1.13 | 0.96 | 0.96 | 1.33 | 0.91 | 0.93 | — | — | — | — |

The invention claimed is:

1. A catalyst composition having a formula $(M^t)_a(L^u)_b(S^v)_d(C^w)_e(H^x)_f(O^y)_g(N^z)_h$, wherein M is at least a metal selected from group VIB metals, L is at least a promoter metal selected from a non-noble Group VIII metal, a Group VIIIB metal, a Group VIB metal, a Group IVB metal, and a Group IIB metal, b >= 0, 0 <= b/a <= 5, (a+0.5b) <= d <= (5a+2b), 0 <= e <= 11(a+b), 0 <= f <= 7(a+b), 0 <= g <= 5(a+b), 0 <= h <= 0.5(a+b), t, u, v, w, x, y, z, each representing total charge for each of: M, L, S, C, H, O and N, respectively, ta+ub+vd+we+xf+yg+zh=0;

and wherein the catalyst has an X-ray powder diffraction pattern with at least one broad diffraction peak at any of Bragg angles: 8 to 18°, 32 to 40°, and 55 to 65° (from 0 to 70° 2θ scale).

2. The catalyst composition of claim 1, wherein the catalyst composition is substantially free of promoter metal L.

3. The catalyst composition of claim 2, wherein b=0.

4. The catalyst composition of claim 3, wherein the at least one diffraction peak is greater than 2 degrees wide at ½ height.

5. The catalyst composition of claim 1, wherein the at least one diffraction peak is at Bragg angle of 8 to 18° (from 0 to 70° 2θ scale).

6. The catalyst composition of claim 3, wherein the diffraction peak at Bragg angle 8 to 18° (from 0 to 70° 2θ scale) is greater than 2 degrees wide at ½ height.

7. The catalyst composition of claim 4, wherein the diffraction peak at Bragg angle 8 to 18° (from 0 to 70° 2θ scale) is greater than 5 degrees wide at ½ height.

8. The catalyst composition of claim 1, having a first broad diffraction peak at Bragg angle of 8 to 18° (from 0 to 70° 2θ scale) and a second first broad diffraction peak at Bragg angle of 32 to 40° (from 0 to 70° 2θ scale).

9. The catalyst composition of claim 1, wherein the catalyst has a median particle size of 0.0005 to 1000 microns.

10. The catalyst composition of claim 1, wherein the catalyst has an average particle size of 0.3 to 20 μm.

11. The catalyst composition of claim 1, wherein the catalyst has a pore volume of 0.05-5 ml/g as determined by nitrogen adsorption.

12. The catalyst composition of claim 1, wherein the catalyst has a pore volume of 0.1-4 ml/g as determined by nitrogen adsorption.

13. The catalyst composition of claim 1, wherein the catalyst has a surface area of at least 5 m²/g.

14. The catalyst composition of claim 1, wherein M is selected from molybdenum, tungsten, and mixtures thereof and L is selected from nickel, cobalt, and mixture thereof.

15. The catalyst composition of claim 1, wherein L is selected from nickel, cobalt and combinations thereof, the catalyst is of the formula $(M)_a(Ni_zCo_{1-z})_b(S)_d(C)_e(H)_f(O)_g(N)_h$, and wherein 0 < z < 1.

16. The catalyst composition of claim 1, wherein M is selected from molybdenum, tungsten, and combinations thereof, the catalyst is of the formula $(Mo_zW_{1-z})_a(L)_b(S)_d(C)_e(H)_f(O)_g(N)_h$, and wherein 0 < z < 1.

17. The catalyst composition of claim 1, wherein L is selected from Ni, Co, Fe, Zn, Cr, Ti, and combinations thereof, the catalyst is of the formula $(M)_a(Ni_zCo_{z'}Fe_{z''}Zn_{z^*}Cr_{z^{*'}}Ti_{z^{*''}})_b(S)_d(C)_e(H)_f(O)_g(N)_h$, and wherein $0 \leq z, z', z'', z^*, z^{*'}, z^{*''}$ and $(z+z'+z''+z^*+z^{*'}+z^{*''})=1$.

18. The catalyst composition of claim 1, wherein the molar ratio b/a ranges from 0.5 to 2.

19. The catalyst composition of claim 1, wherein the catalyst further comprises a refractory oxide material which comprises 50 wt. % or more titania, on oxide basis.

20. A catalyst composition having a formula $(M^t)_a(L^u)_b(S^v)_d(C^w)_e(H^x)_f(O^y)_g(N^z)_h$, wherein M is selected from molybdenum, tungsten, and mixtures thereof,
L is selected from Ni, Co, Fe, Zn, Cr, Ti, and mixtures thereof,
$0 =< b/a =< 5$,
$(a+0.5b) <= d <= (5a+2b)$,
$0 <= e <= 11(a+b)$,
$0 <= f <= 7(a+b)$,
$0 <= g <= 5(a+b)$,
$0 <= h <= 0.5(a+b)$,
t, u, v, w, x, y, z, each representing total charge for each of: M, L, S, C, H, O and N, respectively,
$ta+ub+vd+we+xf+yg+zh=0$;
and wherein the catalyst has an X-ray powder diffraction pattern with a first broad diffraction peak at Bragg angle of 8 to 18° and a second broad diffraction peak at Bragg angle of 32 to 40° (from 0 to 70° 2θ scale).

21. The catalyst composition of claim 20, where in M is selected from molybdenum, tungsten, and mixtures thereof, and L is selected from nickel, cobalt, and mixtures thereof.

\* \* \* \* \*